US011831559B2

(12) United States Patent
Miao et al.

(10) Patent No.: US 11,831,559 B2
(45) Date of Patent: Nov. 28, 2023

(54) SYSTEMS AND METHODS OF ALIGNING MESSAGES FROM MULTIPLE SOURCES

(71) Applicant: THE BOEING COMPANY, Chicago, IL (US)

(72) Inventors: Jinhong Miao, Rancho Palos Verdes, CA (US); Dick Wong, Palos Verdes Peninsula, CA (US)

(73) Assignee: THE BOEING COMPANY, Arlington, VA (US)

( * ) Notice: Subject to any disclaimer, the term of this patent is extended or adjusted under 35 U.S.C. 154(b) by 8 days.

(21) Appl. No.: 17/494,226

(22) Filed: Oct. 5, 2021

(65) Prior Publication Data

US 2022/0217095 A1 Jul. 7, 2022

Related U.S. Application Data

(60) Provisional application No. 63/133,875, filed on Jan. 5, 2021.

(51) Int. Cl.
*H04L 47/56* (2022.01)

(52) U.S. Cl.
CPC .................................. *H04L 47/56* (2013.01)

(58) Field of Classification Search
None
See application file for complete search history.

(56) References Cited

U.S. PATENT DOCUMENTS

| | | | | |
|---|---|---|---|---|
| 8,078,763 B1* | 12/2011 | Boddu | ................... | H04L 47/522 |
| | | | | 709/249 |
| 8,761,181 B1* | 6/2014 | Gostev | ..................... | H04L 47/34 |
| | | | | 370/393 |
| 10,342,024 B1* | 7/2019 | Mehta | .................. | H04L 43/0829 |
| 2006/0143422 A1* | 6/2006 | Mashima | .............. | G06F 3/0613 |
| | | | | 711/170 |
| 2010/0134067 A1* | 6/2010 | Baxter | .................... | B60L 53/67 |
| | | | | 320/109 |
| 2012/0126850 A1* | 5/2012 | Wasson | ............ | H03K 19/17756 |
| | | | | 326/38 |
| 2012/0195355 A1* | 8/2012 | El-Essawy | ............... | H04B 3/56 |
| | | | | 375/257 |
| 2016/0277152 A1* | 9/2016 | Xiang | .................... | H04L 1/1896 |
| 2018/0129868 A1* | 5/2018 | Sarkis | .................... | G06V 10/80 |
| 2019/0073284 A1* | 3/2019 | Anderson | ............ | G06F 11/1625 |
| 2020/0389824 A1* | 12/2020 | Kumar | ................... | H04W 76/15 |
| 2022/0030411 A1* | 1/2022 | Venkatram | ............ | H04W 76/50 |

* cited by examiner

*Primary Examiner* — Jason E Mattis
*Assistant Examiner* — Bao G Nguyen
(74) *Attorney, Agent, or Firm* — Moore IP Law

(57) ABSTRACT

A device includes a first message queue, a second message queue, a first queue manager coupled to the first message queue, and a second queue manager coupled to the second message queue. The first message queue is configured to store messages received from a first source. The second message queue is configured to store messages received from a second source. The first queue manager is configured to, based, at least in part, on detecting that a first message is added to the first message queue, send a request to a second queue manager. The request includes an indication of the first message. The first queue manager is also configured to, based on receiving an acknowledgement from the second queue manager and determining that the acknowledgement indicates that a second message matching the first message is stored in the second message queue, output a match indicator indicating the first message.

20 Claims, 15 Drawing Sheets

SYSTEMS AND METHODS OF ALIGNING MESSAGES FROM MULTIPLE SOURCES

CROSS-REFERENCE TO RELATED APPLICATIONS

The present application claims the benefit of U.S. Provisional Patent Application No. 63/133,875 entitled "SYSTEMS AND METHODS OF ALIGNING MESSAGES FROM MULTIPLE SOURCES," filed Jan. 5, 2021, the contents of which are incorporated by reference in their entirety.

FIELD OF THE DISCLOSURE

The present disclosure is generally related to aligning messages received from multiple sources.

BACKGROUND

Various mission-critical and/or safety-critical processes rely on messages independently generated by multiple sources. For example, a temperature sensor generates temperature sensor messages indicating temperature readings, and a speed sensor generates speed sensor messages indicating speed. To evaluate the temperature reading for a particular speed, a temperature sensor message indicating the temperature reading detected at a particular time has to be matched (e.g., time aligned) with a speed sensor message indicating the speed detected at approximately the same time. A message from one of the sensors can be delayed relative to a matching message from the other sensor. In some examples, the mission-critical and/or safety-critical processes expect to receive synchronized sensor messages. In other examples, adding synchronization functionality at the mission-critical and/or safety-critical processes increases complexity at each of the processes.

SUMMARY

In a particular implementation, a device includes a first message queue, a second message queue, a first queue manager coupled to the first message queue, and a second queue manager coupled to the second message queue. The first message queue is configured to store first messages received from a first source. The second message queue is configured to store second messages received from a second source. The first queue manager is configured to, based, at least in part, on detecting that a first message is added to the first message queue, send a first request to a second queue manager. The first request includes a first indication of the first message. The first queue manager is also configured to, based, at least in part, on receiving a first acknowledgement from the second queue manager and determining that the first acknowledgement indicates that a second message matching the first message is stored in the second message queue, output a first match indicator indicating the first message.

In another particular implementation, a method includes, based, at least in part, on detecting that a first message is added to a first message queue, sending a first request from a first queue manager of the first message queue to a second queue manager of a second message queue. The first request includes a first indication of the first message. The method also includes, based, at least in part, on receiving a first acknowledgement from the second queue manager and determining that the first acknowledgement indicates that a second message matching the first message is stored in the second message queue, outputting a first match indicator indicating the first message.

In another particular implementation, a computer-readable storage device stores instructions that, when executed by one or more processors, cause the one or more processors to, based, at least in part, on detecting that a first message is added to a first message queue, send a first request from a first queue manager of the first message queue to a second queue manager of a second message queue. The first request includes a first indication of the first message. The instructions, when executed by the one or more processors, also cause the one or more processors to, based, at least in part, on receiving a first acknowledgement from the second queue manager and determining that the first acknowledgement indicates that a second message matching the first message is stored in the second message queue, output a first match indicator indicating the first message.

The features, functions, and advantages described herein can be achieved independently in various implementations or may be combined in yet other implementations, further details of which can be found with reference to the following description and drawings.

DETAILED DESCRIPTION

Figure 1:
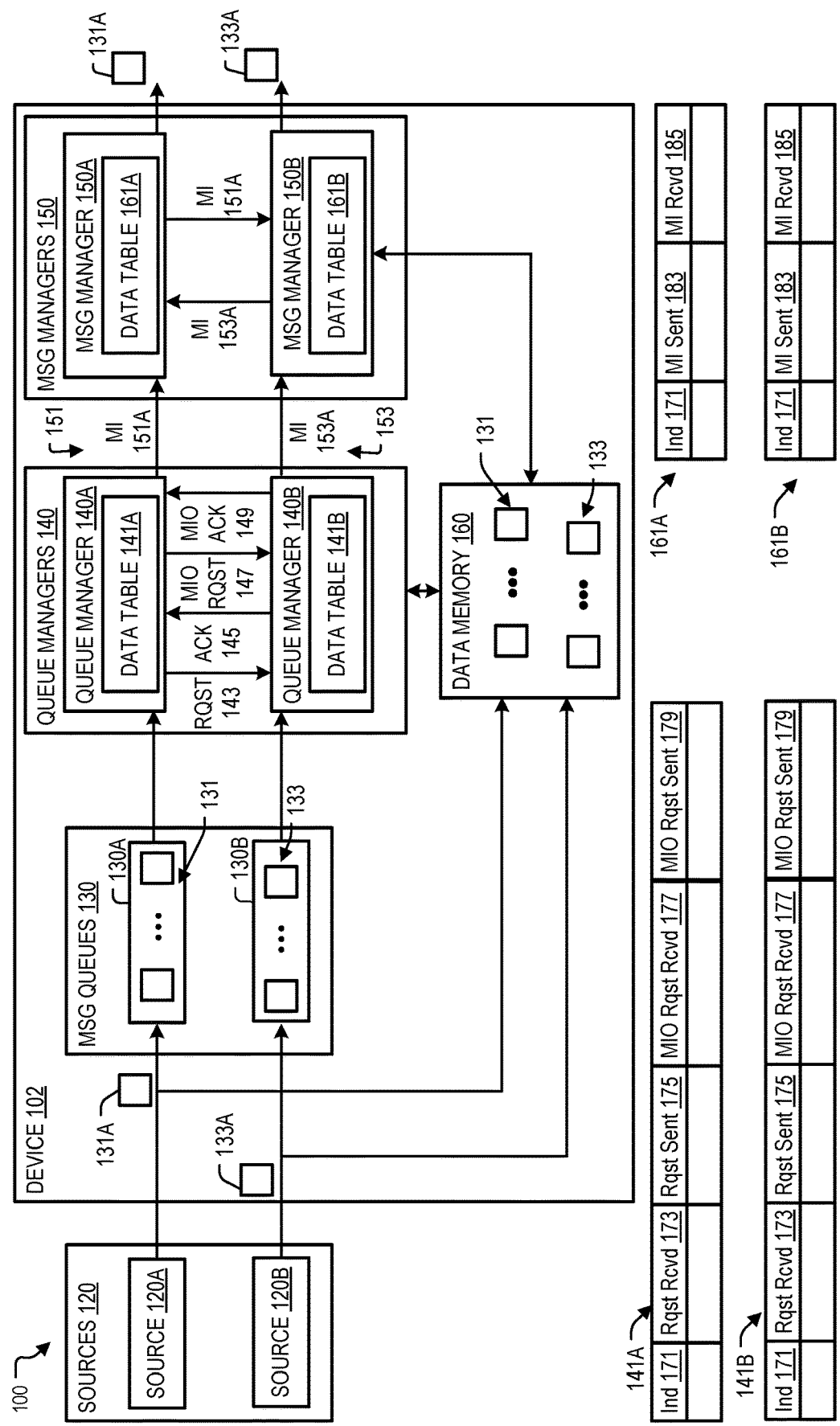
FIG. 1 is a diagram that illustrates a system configured to align messages from multiple sources.

Aspects disclosed herein present systems and methods for aligning messages from multiple sources. A device includes message queues that each store messages received from a particular source. For example, a first message queue stores messages (or indications of the messages) received from a first source, and a second message queue stores messages from a second source. The device includes queue managers that manage the message queues. For example, the queue managers track whether matching messages have been received and are stored in the message queues. A first message from the first source matches a second message from the second source if a first indication of the first message matches a second indication of the second message. For example, the first indication matches the second indication if the first indication and the second indication satisfy a match criterion.

The match criterion can be based on a configuration setting, a default value, a user input, or a combination thereof. In a particular example, the first indication (e.g., a first counter value of a counter at the first source) and the second indication (e.g., a second counter value of a counter at the second source) satisfy the match criterion when the first indication indicates the same value as the second indication. In another example, the first indication and the second indication satisfy the match criterion when a difference between the first indication and the second indication is less than or equal to a match threshold.

The device also includes message managers that output matching messages in response to receiving match indicators from the queue managers that indicate that matching messages have been received in each of the message queues. The queue managers and message managers enable holding back a message from a source until a matching message from each remaining source is received and outputting the matching messages substantially concurrently (e.g., in alignment). The aligned messages are available for further processing.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple sources are illustrated and associated with reference numbers 120A and 120B. When referring to a particular one of these sources, such as the source 120A, the distinguishing letter "A" is used. However, when referring to any arbitrary one of these sources or to these sources as a group, the reference number 120 is used without a distinguishing letter.

Figure 15:
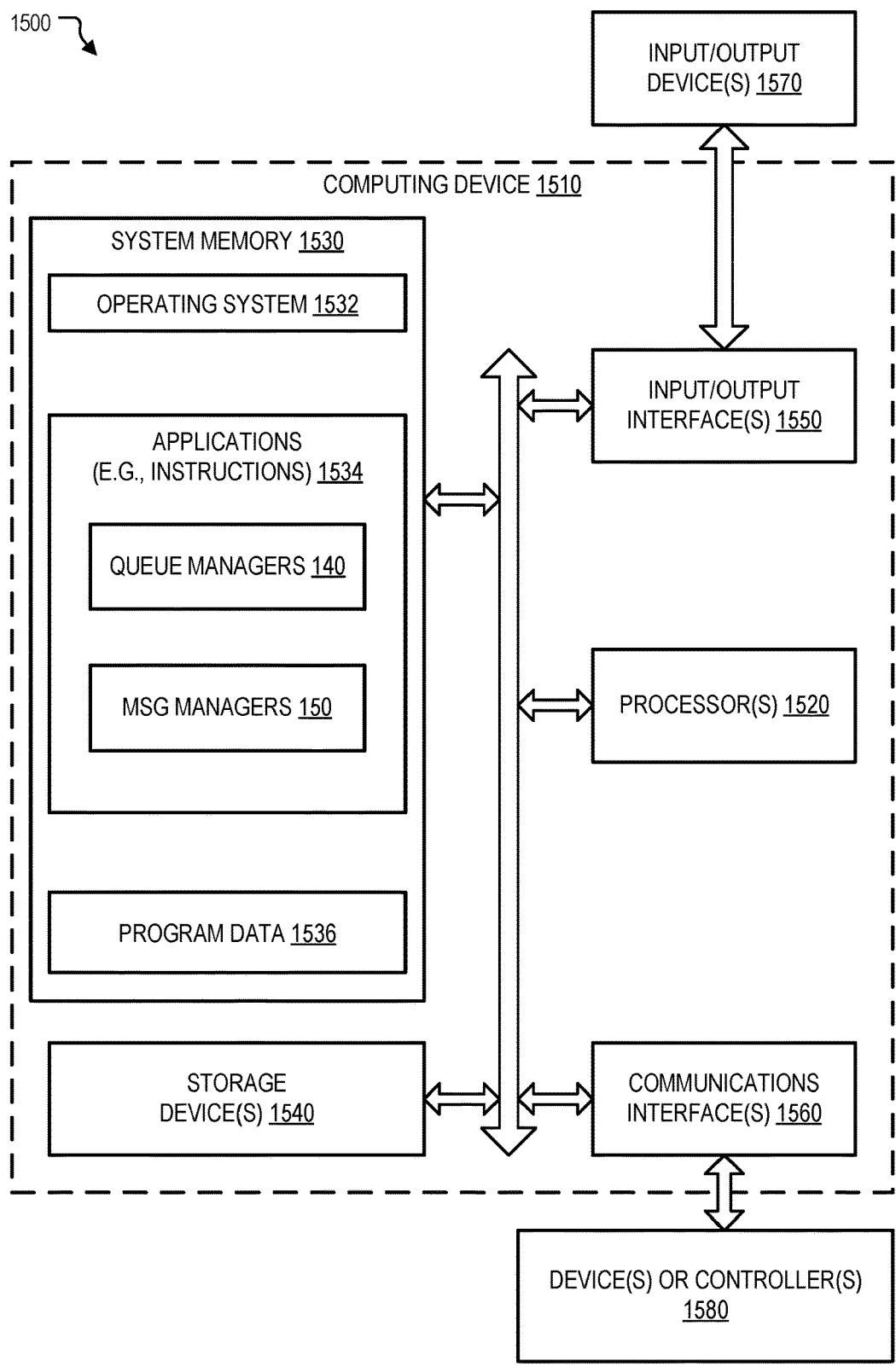
FIG. 15 is a block diagram of a computing environment including a computing device configured to support aspects of computer-implemented methods and computer-executable program instructions (or code) according to the present disclosure.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 15 depicts a computing device 1510 including one or more processors ("processor(s)" 1520 in FIG. 15), which indicates that in some implementations the computing device 1510 includes a single processor 1520 and in other implementations the computing device 1510 includes multiple processors 1520. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example of a system 100 that is configured to align messages from multiple sources. The system 100 includes a device 102 coupled to a plurality of sources 120 that is configured to provide messages to the device 102. For example, the device 102 is coupled to a source 120A, a source 120B, one or more additional sources, or a combination thereof. Each of the sources 120 can include a processor, a sensor, a computing device, any type of virtual or physical hardware, etc.

The device 102 includes a plurality of message queues 130, a plurality of queue managers 140, a plurality of message managers 150, a data memory 160, or a combination thereof. The message queues 130 are configured to store messages received from the sources 120. For example, a message queue 130A is configured to store one or more messages 131 from the source 120A. A message queue 130B is configured to store one or more messages 133 from the source 120B.

In a particular aspect, an indication of the message is stored in the message queue 130. The indication can include a pointer (e.g., a header, an identifier, or both) of the message or the message itself. If the indication stored in the message queue 130 includes a pointer to the message (and not the message itself), the message is stored in the data memory 160. For convenience of description, storing a message in a message queue 130 as used herein refers to either of the above, unless stated otherwise in context.

The queue managers 140 and the message managers 150 are configured to cooperate to align two or more messages stored in the message queues 130 to generate a synchronized or aligned output of the two or more messages. For example, the queue managers 140 are configured to output match indicators to the message managers 150 when a set of matching messages are identified in the message queues 130, and the message managers 150 are configured to output the matching messages responsive to receiving the match indicators.

A queue manager 140A and a queue manager 140B of the queue managers 140 manage the message queue 130A and the message queue 130B, respectively. For example, the queue manager 140A provides match indicators 151 to a message manager 150A of the message managers 150 in response to determining that messages matching the messages 131 are stored in other message queues 130, and the queue manager 140B provides match indicators 153 to a message manager 150B of the message managers 150 in response to determining that messages matching the messages 133 are stored in other message queues 130. To illustrate, the queue manager 140A provides a match indicator (MI) 151A to a message manager 150A in response to detecting that a message 131A is added to the message queue 130A, determining that the queue manager 140B indicates that a message 133A is stored in a message queue 130B, and determining that (e.g., a first indication of) the message 131A matches (e.g., a second indication of) the message 133A. Similarly, the queue manager 140B provides a match indicator (MI) 153A to the message manager 150B in response to determining that the queue manager 140A indicates that the message 131A is stored in the message queue 130A, detecting that the message 133A is added to the message queue 130B, and determining that the message 133A matches the message 131A. A match indicator indicates that all matching messages for a particular message are stored in the message queues 130. In a particular aspect, the match indicator 151A includes an indication of the message 131A to imply that all matching messages for the message 131A are stored in the message queues 130, and the match indicator 153A includes an indication of the message 133A to imply that all matching messages for the message 133A are stored in the message queues 130.

The message manager 150A is configured to output the messages 131 in response to receiving the match indicators 151, and the message manager 150B is configured to output the messages 133 in response to receiving the match indicators 153. For example, the message manager 150A outputs the message 131A in response to receiving the match indicator 151A for the message 131A from the queue manager 140A and determining that the message manager 150B has received the match indicator 153A for a matching message (e.g., the message 133A). The message manager 150B outputs the message 133A in response to receiving the match indicator 153A for the message 133A from the queue manager 140B and determining that the message manager 150A has received the match indicator 151A for a matching message (e.g., the message 131A). Although the message 133A is added to the message queue 130B independently of the message 131A being added to the message queue 130A, the message 133A is output by the message manager 150B concurrently with output of the message 131A by the message manager 150A.

In a particular aspect, each of the queue managers 140 corresponds to an active port array. For example, a first active port array includes the message queue 130A and is managed by the queue manager 140A, and a second active port array includes the message queue 130B and is managed by the queue manager 140B. The first active port array (e.g., the message queue 130A) can be accessed by the queue manager 140A simultaneously with the second active port array (e.g., the message queue 130B) being accessed by the queue manager 140B which enables the queue managers 140 and the message managers 150 to match messages from the message queues 130.

The queue managers 140 and the message managers 150 include or have access to data tables to track exchanges of requests and acknowledgements. For example, the queue manager 140A and the queue manager 140B include a data table 141A and a data table 141B, respectively, to track requests and acknowledgements exchanged between the queue manager 140A and the queue manager 140B. The message manager 150A and the message manager 150B include a data table 161A and a data table 161B, respectively, to track match indicators exchanged between the message manager 150A and the message manager 150B.

In a particular implementation, a data table 141 of a queue manager 140 includes an indication (ind) field 171, a request (rqst) received (rcvd) field 173, a request sent field 175, a match indicator output (MIO) request received field 177, a MIO request sent field 179, or a combination thereof. The indication field 171 of a particular entry of the data table 141 is used to include an indication of a particular message. The request received field 173 and the request sent field 175 of the particular entry are used to indicate whether a request is received or sent by the queue manager 140 for the particular message, as described herein. The MIO request received field 177 and the MIO request sent field 179 of the particular entry are used to indicate whether a MIO request is received or sent by the queue manager 140 for the particular message, as described herein.

In a particular implementation, a data table 161 of a message manager 150 includes an indication field 171, a match indicator (MI) sent field 183, a MI received field 185, or both. The indication field 171 of a particular entry of the data table 161 is used to include an indication of a particular message. The MI sent field 183 and the MI received field 185 of the particular entry are used to indicate whether a MI is received or sent by the message manager 150 for the particular message, as described herein.

In a particular implementation, the queue managers 140, the message managers 150, or a combination thereof, are implemented in hardware or circuitry that accesses the data tables 141, the data tables 161, or a combination thereof. For example, the data tables 141, the data tables 161, or a combination thereof, are implemented as registers. In another example, the data tables 141, the data tables 161, or a combination thereof, are implemented as a data structure in a multipurpose memory.

In a particular aspect, logic gates of a queue manager 140 perform a comparison of an indication included in a request or acknowledgement with the indication field 171 of each entry (e.g., each entry that includes valid data) of a data table 141 to find a corresponding entry. The queue manager 140 updates the corresponding entry in response to identifying the corresponding entry based on the comparison. In some examples, the queue manager 140 initializes an entry in response to determining, based on the comparison, that the data table 141 does not include a corresponding entry. To illustrate, the queue manager 140 initializes a first entry of the data table 141 in response to receiving a request and determining that the data table 141 does not include a corresponding entry. In other examples, the queue manager 140 discards the request or acknowledgement in response to determining, based on the comparison, that the data table 141 does not include a corresponding entry. To illustrate, the queue manager 140 discards an acknowledgement in response to determining that the data table 141 does not include a corresponding entry (e.g., because the corresponding message timed out).

Similarly, logic gates of a message manager 150 perform a comparison of an indication included in a match indicator with the indication field 171 of each entry (e.g., each entry that includes valid data) of a data table 161 to find a corresponding entry. The message manager 150 updates the corresponding entry in response to identifying the corresponding entry based on the comparison. In some examples, the message manager 150 initializes an entry in response to determining, based on the comparison, that the data table 161 does not include a corresponding entry. To illustrate, the message manager 150 initializes a first entry of the data table 161 in response to receiving a match indicator, determining that the data table 141 includes a corresponding entry, and determining that the data table 161 does not include a corresponding entry.

During operation, the source 120A provides a message 131A to the device 102 at a first time. An indication of the message 131A is stored in the message queue 130A. In a particular implementation, the message 131A itself is stored in the message queue 130A. In an alternative implementation, a pointer of the message 131A is stored in the message queue 130A and the message 131A is stored in the data memory 160. The queue manager 140A, based on detecting that the message 131A (e.g., the indication of the message 131A) is added to the message queue 130A, determines whether a matching message is stored at the message queue 130B. For example, the queue manager 140A checks whether any entry of the data table 141A includes an indication in an indication field 171 that matches the first indication of the message 131A.

The queue manager 140A, in response to determining that a matching message is not stored at the message queue 130B (e.g., no request has been received from the queue manager 140B that indicates a message matching the message 131A), informs the queue manager 140B that the message 131A is stored at the message queue 130A. For example, the queue manager 140A, in response to determining that none of the entries of the data table 141A include an indication that matches the first indication, sends a request (rqst) 143 to the queue manager 140B indicating that the message 131A having the first indication is stored at the message queue 130A. For example, the request 143 includes the first indication. The queue manager 140A updates an entry of the data table 141A to indicate that the request 143 has been sent. To illustrate, the queue manager 140A sets an indication field 171 of a first entry of the data table 141A to include the first indication, sets a request sent field 175 of the first entry to a first value (e.g., 1 or true) to indicate that the request 143 has been sent, or both. In a particular aspect, the queue manager 140A initializes a request received field 173, a MIO request received field 177, a MIO request sent field 179 of the first entry, or a combination thereof, to indicate that corresponding requests have not been exchanged.

The queue manager 140B, in response to receiving the request 143 including the first indication of the message 131A, determines whether a matching message is stored at the message queue 130B. For example, the queue manager 140B, in response to receiving the request 143, determines whether any entry of the data table 141B includes an indication in an indication field 171 that matches the first indication.

In a particular implementation, the queue manager 140B determines whether the first indication matches a second indication based on determining whether the first indication and the second indication satisfy a match criterion. In a particular aspect, the queue manager 140B determines that the match criterion is satisfied in response to determining that the first indication is identical to the second indication. In an alternative aspect, the first indication, although not identical to the second indication, is considered as matching the second indication. For example, the queue manager 140B determines that the match criterion is satisfied in response to determining that the first indication indicates a first value that is within a threshold of a second value indicated by the second indication. In a particular aspect, the match criterion is based on a default value, a configuration setting, user input, a hardware setting, or a combination thereof.

The queue manager 140B, in response to determining that a matching message is not stored at the message queue 130B, updates the data table 141B to track that the message 131A is stored at the message queue 130A. To illustrate, the queue manager 140B sets an indication field 171 of a first entry of the data table 141B to include the first indication, sets a request received field 173 of the first entry to a first value (e.g., 1 or true) to indicate that the request 143 has been received, or both. In a particular aspect, the queue manager 140B initializes a request sent field 175, a match indicator output (MIO) request received field 177, a MIO request sent field 179 of the first entry, or a combination thereof, to indicate that corresponding requests have not been exchanged.

The source 120B provides a message 133A to the device 102 at a second time. The message 133A is stored in the message queue 130B. For example, the second indication of the message 133A is stored in the message queue 130B, and the message 133A is stored in the data memory 160. The queue manager 140B, based on detecting that the message 133A (e.g., the indication of the message 133A) is added to the message queue 130B, determines whether a matching message is stored at the message queue 130A. For example, the queue manager 140B checks whether any entry of the data table 141B includes an indication in an indication field 171 that matches the second indication of the message 133A.

The queue manager 140B determines that the first entry of the data table 141B includes the first indication of the message 131A that matches the second indication of the message 133A. For example, the queue manager 140B determines that the second indication matches the first indication in response to determining that the first indication and the second indication satisfy a match criterion. For example, the first indication indicates a first counter value of a first counter of the source 120A, the second indication indicates a second counter value of a second counter of the source 120B, and the queue manager 140B determines that the match criterion is satisfied in response to determining that the first counter value is identical to the second counter value. In another example, the queue manager 140B determines that the match criterion is satisfied in response to determining that the first indication indicates a first value that is within a threshold of a second value indicated by the second indication.

The queue manager 140B, in response to determining that a matching message is stored at the message queue 130A, informs the queue manager 140A that the message 133A that matches the message 131A is stored at the message queue 130B. For example, the queue manager 140B, in response to determining that the first entry of the data table 141B includes the first indication that matches the second indication, sends an acknowledgement (ack) 145 to the queue manager 140A. The acknowledgement 145 indicates that the message 133A that matches the message 131A is stored at the message queue 130B. For example, the acknowledgement 145 includes the first indication, the second indication, or both.

In a particular implementation, the queue manager 140B outputs a match indicator 153A to the message manager 150B concurrently with sending the acknowledgement 145 to the queue manager 140A. The match indicator 153A includes the first indication, the second indication, or both. In this implementation, the queue manager 140A outputs a match indicator 151A to the message manager 150A in response to receiving the acknowledgement 145 from the queue manager 140B. The match indicator 151A includes the first indication, the second indication, or both.

In an alternative implementation, the queue manager 140B outputs the match indicator 153A to the message manager 150B concurrently with sending a match indicator output (MIO) acknowledgement 149 to the queue manager 140B. For example, the queue manager 140A, in response to receiving the acknowledgement 145 from the queue manager 140B, sends a match indicator output (MIO) request 147 to the queue manager 140B, updates the match indicator output request sent field 179 of the first entry of the data table 141A to a first value (e.g., 1) to indicate that the match indicator output request 147 has been sent, or both. The match indicator output request 147 includes the first indication, the second indication, or both.

The queue manager 140B, in response to receiving the match indicator output request 147, sends the match indicator output acknowledgement 149 to the queue manager 140A, updates the match indicator output request received field 177 of the first entry of the data table 141B to a first value (e.g., 1) to indicate that the match indicator output request 147 has been received, or both. The queue manager 140B, concurrently with sending the match indicator output acknowledgement 149 to the queue manager 140A, outputs the match indicator 153A to the message manager 150B. The queue manager 140A, in response to receiving the match indicator output acknowledgement 149 from the queue manager 140B, outputs the match indicator 151A to the message manager 150A.

In a particular aspect, the queue manager 140A, in response to outputting the match indicator 151A to the message manager 150A, removes the message 131A (e.g., the first indication) from the message queue 130A, marks the first entry of the data table 141A as available for use (e.g., marked as including invalid data), or both. In a particular aspect, the queue manager 140B, in response to outputting the match indicator 153A to the message manager 150B, removes the message 133A (e.g., the second indication) from the message queue 130B, marks the first entry of the data table 141B as available for use (e.g., marked as including invalid data), or both.

In a particular aspect, although the message 131A and the message 133A are received asynchronously by the device 102 from the source 120A and the source 120B, the match indicators 151A and 153A are output substantially concurrently by the queue manager 140A and the queue manager 140B. For example, a delay between the queue manager 140B sending the match indicator 153A and the queue manager 140A sending the match indicator 151A is less than a delay between the message queue 130A receiving the message 131A and the message queue 130B receiving the message 133A.

The message manager 150B, in response to receiving the match indicator 153A from the queue manager 140B, determines whether a match indicator matching the match indicator 153A has been received by the message manager 150A from the queue manager 140A. For example, the message manager 150B, determines whether any entry of the data table 161B includes an indication in the indication field 171 that matches the first indication of the message 131A or the second indication of the message 133A.

The message manager 150B, in response to determining that no matching match indicator has been received by the message manager 150A, sends the match indicator 153A to the message manager 150A, updates the data table 161B to indicate that the match indicator 153A is sent to the message manager 150A, or both. For example, the message manager 150B updates a first entry of the data table 161B by setting an indication field 171 to include the first indication, the second indication, or both, setting a match indicator sent field 183 to a first value (e.g., 1 or true) to indicate that the match indicator 153A has been sent to the message manager 150A, or both. In a particular aspect, the message manager 150B initializes a match indicator received field 185 of the first entry of the data table 161B to a second value (e.g., 0 or false) to indicate that a matching match indicator has not been received from the message manager 150A.

The message manager 150A, in response to receiving the match indicator 153A, determines whether a matching match indicator has been received from the queue manager 140A. For example, the message manager 150A, determines whether any entry of the data table 161A includes an indication in the indication field 171 that matches the first indication of the message 131A or the second indication of the message 133A indicated by the match indicator 153A. The message manager 150A, in response to determining that no matching match indicator has been received from the queue manager 140A, updates the data table 161A to indicate that the match indicator 153A is received from the message manager 150B. For example, the message manager 150A updates a first entry of the data table 161A by setting an indication field 171 to include the first indication, the second indication, or both, setting a match indicator received field 185 to a first value (e.g., 1 or true) to indicate that the match indicator 153A has been received from the message manager 150B, or both. In a particular aspect, the message manager 150A initializes a match indicator sent field 183 of the first entry of the data table 161A to a second value (e.g., 0 or false) to indicate that a matching match indicator has not been sent to the message manager 150B.

The message manager 150A, in response to receiving the match indicator 151A from the queue manager 140A, determines whether a match indicator matching the match indicator 151A has been received by the message manager 150B from the queue manager 140B. For example, the message manager 150A, determines that the first entry of the data table 161A includes an indication in the indication field 171 that matches an indication (e.g., the first indication of the message 131A, the second indication of the message 133A, or both) included in the match indicator 151A and that match indicator received field 185 of the first entry has a first value (e.g., 1 or true) indicating that the matching match indicator (e.g., the match indicator 153A) has been received from the message manager 150B.

The message manager 150A, in response to determining that a matching match indicator has been received from the message manager 150B, sends the match indicator 151A to the message manager 150B, updates the data table 161A to indicate that the match indicator 151A is sent to the message manager 150B, or both. For example, the message manager 150A updates the first entry of the data table 161A by setting a match indicator sent field 183 to a first value (e.g., 1 or true) to indicate that the match indicator 151A has been sent to the message manager 150B.

The message manager 150A, in response to determining that matching indicators have been exchanged with the message manager 150B, outputs the message 131A from the data memory 160. For example, the message manager 150A, in response to determining that the match indicator sent field 183 of the first entry of the data table 161A has a first value (e.g., 1 or true) and the match indicator received field 185 of the first entry of the data table 161A has a first value (e.g., 1 or true), outputs the message 131A indicated by (e.g., the first indication) of the indication field 171 of the first entry.

The message manager 150A, in response to outputting the message 131A, deletes (or marks for deletion) the message 131A from the data memory 160, removes the message 131A (e.g., the first indication) from the message queue 130A, or both. The message manager 150A, in response to outputting the message 131A, marks the first entry of the data table 161A as available for use (e.g., marked as including invalid data).

The message manager 150B, in response to receiving the match indicator 151A, determines whether a matching match indicator has been received from the queue manager 140B. For example, the message manager 150B, determines whether any entry of the data table 161B includes an indication in the indication field 171 that matches the indication (e.g., the first indication of the message 131A or the second indication of the message 133A) indicated by the match indicator 151A. The message manager 150B, in response to determining that the first entry of the data table 161B indicates that a matching match indicator has been received from the queue manager 140B, updates the first entry of the data table 161B to indicate that the match indicator 151A is received from the message manager 150A. For example, the message manager 150B updates the first entry of the data table 161B by setting a match indicator received field 185 to a first value (e.g., 1 or true) to indicate that the match indicator 151A has been received from the message manager 150A.

The message manager 150B, in response to determining that matching indicators have been exchanged with the message manager 150B, outputs the message 133A from the data memory 160. For example, the message manager 150B, in response to determining that the match indicator sent field 183 of the first entry of the data table 161B has a first value (e.g., 1 or true) and the match indicator received field 185 of the first entry of the data table 161B has a first value (e.g., 1 or true), outputs the message 133A indicated by (e.g., the second indication) of the indication field 171 of the first entry.

The message manager 150B, in response to outputting the message 133A, deletes (or marks for deletion) the message 133A from the data memory 160, removes the message 133A (e.g., the second indication) from the message queue 130B, or both. The message manager 150B, in response to outputting the message 133A, marks the first entry of the data table 161B as available for use (e.g., marks as including invalid data).

In a particular aspect, the message 131A and the message 133A are output by the message manager 150A and the message manager 150B to another component of the device 102, a second device, or both. For example, the message 131A and the message 133A are processed by a security or safety application.

The system 100 thus enables the message 131A to be output by the message manager 150 concurrently with output of the message 133A by the message manager 150B even though the message 131A is received from the source 120A asynchronously from receipt of the message 133A from the source 120B.

Although the queue managers 140 and the message managers 150 are depicted as separate components, in other implementations the described functionality of two or more of the queue managers 140 and the message managers 150 can be performed by a single component. In some implementations, each of the queue managers 140 and the message managers 150 can be represented in hardware, such as via an application-specific integrated circuit (ASIC) or a field-programmable gate array (FPGA), or the operations described with reference to the elements may be performed by a processor executing computer-readable instructions.

Although FIG. 1 illustrates particular examples for clarity of explanation, such examples are not to be considered as limitations. For example, although the message 133A is described as being added to the message queue 130B subsequent to the message 131A being added to the message queue 130A, in other examples a message can be added to the message queue 130B prior to or at the same time as a matching message being added to the message queue 130A, as further described with reference to FIG. 4.

Although the message queues 130 are described as including two message queues, in other examples the message queues 130 can include more than two message queues. For example, the message queues 130 can include the message queue 130A, the message queue 130B, and one or more additional message queues. An example that includes three message queues 130 is described with reference to FIGS. 7-8. Matching messages are added asynchronously to each of the message queues 130 and are output concurrently from the message queues 130 (e.g., the data memory 160).

Although matching messages are described as being added to each of the message queue 130, in other examples a matching message may not be received by a message queue 130, as further described with reference to FIG. 9. In some examples, a message that is stored in a message queue 130 (or in the data memory 160) for longer than a threshold duration is considered to have expired and is deleted (or marked for deletion) from the data memory 160, as further described with reference to FIGS. 9-11.

Although each of the data tables 141A and 141B is described as including 5 fields, in some other implementations the data table 141A and the data table 141B can each include more than 5 fields, fewer than 5 fields, different fields, or a combination thereof. For example, in a particular implementation, the data table 141A includes an acknowledgement field (e.g., an acknowledgement sent field, an acknowledgement received field, or both), a match indicator output acknowledgement field (e.g., a match indicator output acknowledgement sent field, a match indicator output acknowledgement received field, or both), or a combination thereof. For example, the queue manager 140B updates the acknowledgement sent field of the first entry of the data table 141B to a first value (e.g., 1 or true) concurrently with sending the acknowledgement 145 to the queue manager 140A. The queue manager 140A updates the acknowledgement received field of the first entry of the data table 141A to a first value (e.g., 1 or true) in response to receiving the acknowledgement 145 from the queue manager 140B. The queue manager 140B updates the match indicator output acknowledgement sent field of the first entry of the data table 141B to a first value (e.g., 1 or true) concurrently with sending the match indicator output acknowledgement 149 to the queue manager 140A. The queue manager 140A updates the match indicator output acknowledgement received field of the first entry of the data table 141A to a first value (e.g., 1 or true) in response to receiving the match indicator output acknowledgement 149 from the queue manager 140B.

Figure 2:
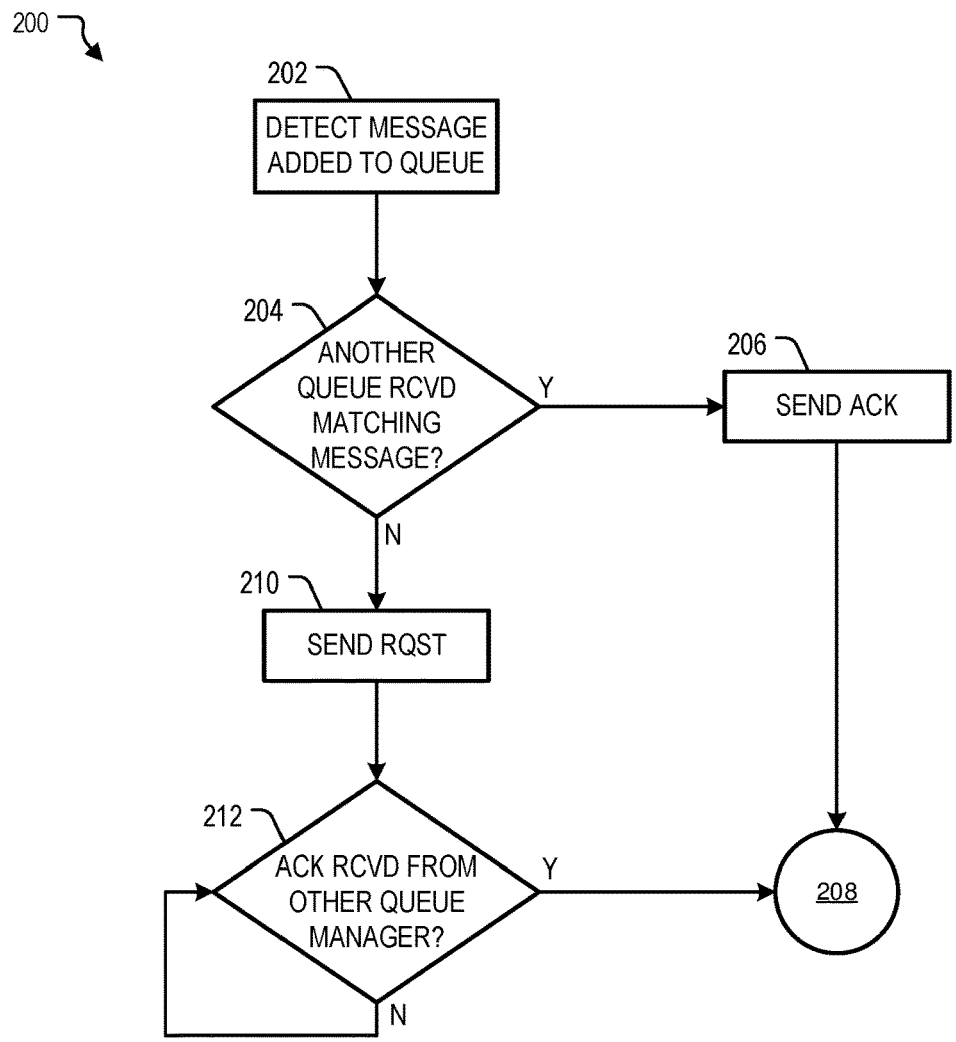
FIG. 2 is a diagram of particular examples of operations performed by the system of FIG. 1.
Figure 2:
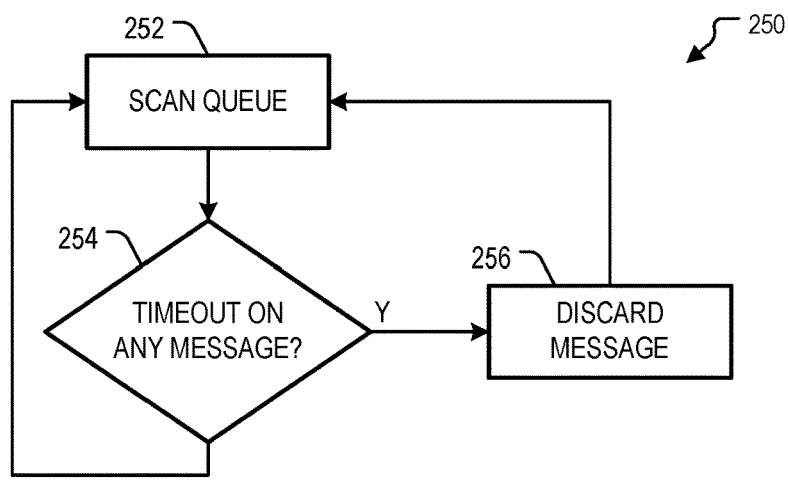

Referring to FIG. 2, an example of operations 200 performed by the system of FIG. 1 is shown. In a particular aspect, one or more of the operations 200 are performed by one or more of the queue managers 140, the device 102, or the system 100 of FIG. 1.

The queue manager 140A detects that the message 131A is added to the message queue 130A, at 202. For example, the queue manager 140A determines that a first indication of the message 131A is added to the message queue 130A, as described with reference to FIG. 1.

The queue manager 140A determines whether another queue (e.g., the message queue 130B) received a matching message, at 204. For example, the queue manager 140 determines whether any entry of the data table 141 includes an indication in the indication field 171 that matches the first indication of the message 131A.

The queue manager 140A, in response to determining that another queue (e.g., the message queue 130B) received a matching message, at 204, sends an acknowledgement, at 206. For example, the queue manager 140A, in response to determining that a first entry of the data table 141A includes an indication that matches the first indication, sends an acknowledgement to the queue manager 140B. The operations 200 proceed to 208.

The queue manager 140A, in response to determining that another queue (e.g., the message queue 130B) has not received a matching message, at 204, sends the request 143, at 210. For example, the queue manager 140A, in response to determining that none of the entries of the data table 141A includes an indication in the indication field 171 that matches the first indication of the message 131A, sends the request 143 to the queue manager 140B, as described with reference to FIG. 1. The queue manager 140A updates a first entry of the data table 141A to include the first indication and indicate that the request 143 is sent, as described with reference to FIG. 1. The queue manager 140A, in response to receiving the acknowledgement 145 from the queue manager 140B, updates the first entry of the data table 141A to indicate that the acknowledgement 145 is received, as described with reference to FIG. 1.

The queue manager 140A determines whether an acknowledgement is received from the other queue manager (e.g., the queue manager 140B), at 212. For example, the queue manager 140A determines whether the first entry of the data table 141A indicates that an acknowledgement is received. The queue manager 140A, in response to determining at a first time that the first entry of the data table 141A indicates that no acknowledgement is received, at 212, determines at a second time whether an acknowledgement is received from the queue manager 140B, at 212. Alternatively, the queue manager 140A, in response to determining that the first entry of the data table 141A indicates that the acknowledgement 145 is received, at 212, proceeds to 208.

The operations 200 are mirrored in each of the queue managers 140. For example, the queue manager 140B of FIG. 1 performs the operations 200. The operations 200 thus enable a queue manager 140 to determine whether matching messages are stored at the message queue 130A and the message queue 130B.

In FIG. 2, an example of operations 250 is shown. In a particular aspect, one or more of the operations 250 are performed by one or more of the queue managers 140, the device 102, or the system 100 of FIG. 1.

The queue manager 140A scans the message queue 130A, at 252. The queue manager 140A determines whether any messages in the message queue 130A have timed out, at 254. For example, each of the messages 131 is associated with a receipt timestamp indicating a receipt time at which the message 131 is added to the message queue 130A. The queue manager 140A determines, at a first time, whether a difference between the receipt time and the first time is greater than a threshold.

The queue manager 140A, in response to determining that none of the messages 131 have timed out, at 254, proceeds to 252. For example, the queue manager 140A, in response to determining at a first time that a difference between the receipt time for each of the messages 131 and the first time, determines that none of the messages 131 have timed out. Alternatively, the queue manager 140A, in response to determining that a message 131 has timed out, at 254, discards the message 131, at 256. For example, the queue manager 140A, in response to determining at a first time that a difference between a receipt time of a message 131 and the first time is greater than a threshold, determines that the message 131 has timed out. The queue manager 140A, in response to determining that the message 131 has timed out, removes an indication of the message 131 from the message queue 130A, deletes (or marks for deletion) the message 131 from the data memory 160, or both.

The operations 250 are mirrored in each of the queue managers 140. For example, the queue manager 140B of FIG. 1 performs the operations 250. The operations 250 thus enable a queue manager 140 to prevent a message from being indefinitely stored in a message queue 130 in case a matching message is lost or delayed.

Figure 3:
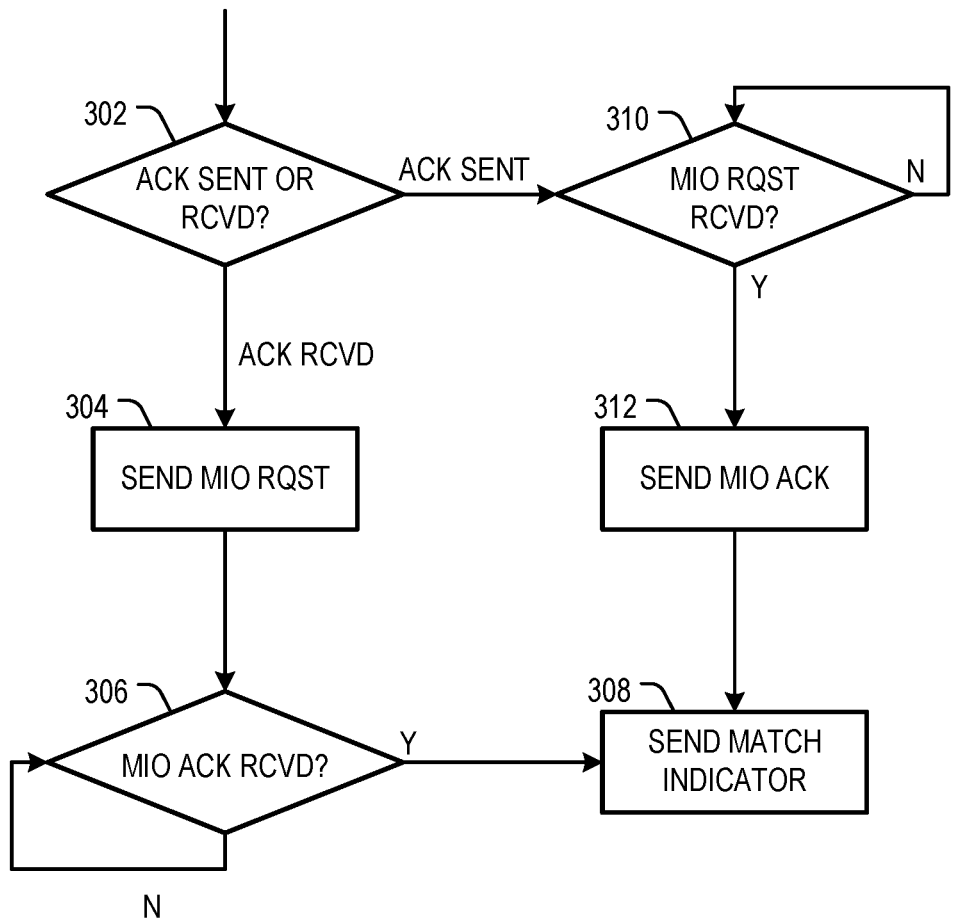
FIG. 3 is a diagram of a particular example of operations performed by the system of FIG. 1.

Referring to FIG. 3, an example of operations 208 performed by the system of FIG. 1 is shown. In a particular aspect, one or more of the operations 208 are performed by one or more of the queue managers 140, the device 102, or the system 100 of FIG. 1.

The queue manager 140A determines whether an acknowledgement is sent or received, at 302. The queue manager 140A, in response to determining that an acknowledgement is received, at 302, sends a match indicator output request, at 304. For example, the queue manager 140A, in response to determining that the acknowledgement 145 is received from the queue manager 140B, sends the match indicator output request 147 to the queue manager 140B, as described with reference to FIG. 1. The queue manager 140A sets the match indicator output request sent field 179 of the first entry of the data table 141 to a first value (e.g., 1 or true) to indicate that the match indicator output request 147 is sent.

The queue manager 140A determines whether a match indicator output acknowledgement is received, at 306. The queue manager 140A, in response to determining at a first time that the first entry of the data table 141A indicates that no match indicator output acknowledgement is received, at 306, determines at a second time whether a match indicator output acknowledgement is received from the queue manager 140B, at 306. Alternatively, the queue manager 140A, in response to determining that the first entry of the data table 141A indicates that the match indicator output acknowledgement 149 is received, at 306, sends the match indicator 151A, at 308. For example, the queue manager 140A sends the match indicator 151A to the message manager 150A in response to receiving the match indicator output acknowledgement 149.

In a particular aspect, the queue manager 140A, in response to determining that an acknowledgement is sent, at 302, determines whether a match indicator output request is received, at 310. For example, the queue manager 140A, in response to determining that a request is received from the queue manager 140B, sends an acknowledgement to the queue manager 140B and waits for the queue manager 140B to send a match indicator output request responsive to receiving the acknowledgement. The queue manager 140A, in response to determining at a first time that the first entry of the data table 141A indicates that no match indicator output request is received, at 310, determines at a second time whether a match indicator output request is received from the queue manager 140B, at 310. Alternatively, the queue manager 140A, in response to determining that the first entry of the data table 141A indicates that a match indicator output request is received, at 310, sends a match indicator output acknowledgement, at 312. For example, the queue manager 140A, in response to determining that the first entry of the data table 141 indicates that a match indicator output requests is received from the queue manager 140B, sends a match indicator output acknowledgement to the queue manager 140B. The operations 208 proceed to 308.

The operations 208 are mirrored in each of the queue managers 140. For example, the queue manager 140B of FIG. 1 performs the operations 208. The operations 208 thus enable a queue manager 140 to output a match indicator after ensuring that the other queue manager has received an acknowledgement.

Figure 4:
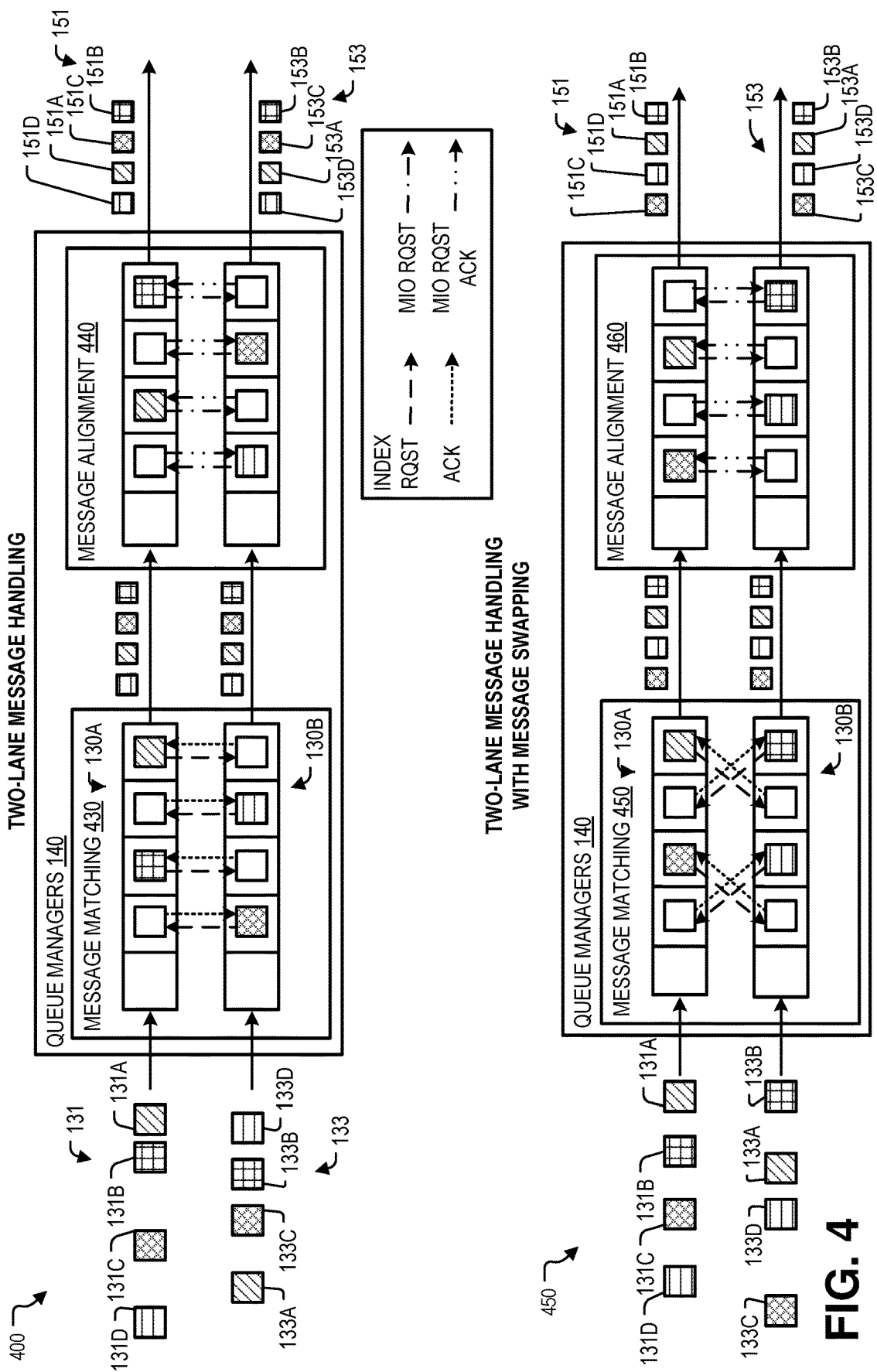
FIG. 4 is a diagram of particular examples of two-lane message handling performed by the system of FIG. 1.

Referring to FIG. 4, an example 400 of two-lane message handling performed by the system of FIG. 1 is shown. In a particular aspect, the queue managers 140 perform message matching 430 and message alignment 440.

Messages 131, messages 133, match indicators 151, and match indicators 153 are illustrated using boxes. Matching shading (e.g., filling) of boxes representing the messages 131 and the messages 133 is used to indicate matching messages. For example, a message 131A, a message 131B, a message 131C, and a message 131D have an indication that matches an indication of a message 133A, a message 133B, a message 133C, and a message 133D, respectively. Matching shading (e.g., filling) of boxes representing the match indicators 151 and the match indicators 153 is used to indicate as corresponding to messages. For example, a match indicator 151A, a match indicator 151B, a match indicator 151C, and a match indicator 151D correspond to the message 131A, the message 131B, the message 131C, and the message 131D, respectively.

During the message matching 430, the queue manager 140A sends a first request to the queue manager 140B in response to determining that the message 131A is added to the message queue 130A. The message 133D is added to the message queue 130B subsequent to adding of the message 131A to the message queue 130A. The queue manager 140B sends a fourth request to the queue manager 140B in response to detecting that the message 133D is added to the message queue 130B.

The message 131B is added to the message queue 130A subsequent to adding of the message 133D to the message queue 130B. The queue manager 140A sends a second request to the queue manager 140B in response to detecting that the message 131B is added to the message queue 130A.

The message 133B is added to the message queue 130B subsequent to adding of the message 131B to the message queue 130A. The queue manager 140B, in response to determining that the message 133B matches the message 131B and that the message 131B is stored at the message queue 130A, sends a second acknowledgement to the queue manager 140A.

The queue manager 140B proceeds to a message alignment phase for the message 133B subsequent to sending the second acknowledgement. The queue manager 140A proceeds to the message alignment phase for the message 131B responsive to receiving the second acknowledgement. For example, during the message alignment 440, the queue manager 140, in response to receiving the second acknowledgement, sends a second match indicator output request to the queue manager 140B. The queue manager 140B, in response to receiving the second match indicator output request, sends a second match indicator output acknowledgement to the queue manager 140A and outputs a match indicator 153B (e.g., including the indication of the message 133B) to the message manager 150B of FIG. 1. The queue manager 140A, in response to receiving the second match indicator output acknowledgement from the queue manager 140B, outputs a match indicator 151B (e.g., including the indication of the message 131A) to the message manager 150A of FIG. 1.

Although the message 131A and the message 133D are added to the message queue 130A and the message queue 130B, respectively, prior to adding of the message 131B to the message queue 130A and adding of the message 133B to the message queue 130B, the match indicator 151B of the message 131B and the match indicator 153B of the message 133B are provided to the message managers 150 responsive to determining that the matching messages (e.g., the message 131B and the message 133B) are both available in the message queues 130. Similarly, a match indicator 151C for the message 131C and a match indicator 153C for the message 133C are output to the message managers 150 in response to detecting that the message 131C is stored in the message queue 130A and that the message 133C is stored in the message queue 130B. A match indicator 151A for the message 131A and a match indicator 153A the message 133A are output to the message managers 150 in response to detecting that the message 131A is stored in the message queue 130A and that the message 133A is stored in the message queue 130B. A match indicator 151D for the message 131D and a match indicator 153D the message 133D are output to the message managers 150 in response to detecting that the message 131D is stored in the message queue 130A and that the message 133D is stored in the message queue 130B.

The message matching 430 and the message alignment 440 thus enable concurrent output of a message 131 (e.g., a match indicator 151 of the message 131) and a matching message 133 (e.g., a match indicator 153 of the message 133) although the message 131 is received from the source 120A asynchronously with receipt of the message 133 from the source 120B.

In FIG. 4, an example 450 of two-lane message handling with message swapping performed by the system of FIG. 1 is shown. In a particular aspect, the queue managers 140 perform message matching 450 and message alignment 460.

During the message matching 450, non-matching messages are received at the message queue 130A and the message queue 130B at the same time. For example, the message 131A is added to the message queue 130A at the same time as the message 133B is added to the message queue 130B.

The queue manager 140A sends a first request to the queue manager 140B in response to detecting that the message 131A is added to the message queue 130A. The queue manager 140B sends a second request to the queue manager 140A in response to detecting that the message 133B is added to the message queue 130B. In a particular aspect, the first request is received by the queue manager 140B at a first time, and the second request is received by the queue manager 140A at a second time. The first time can be earlier (e.g., less than), same as (e.g., equal to), or subsequent to (e.g., greater than) the second time.

The message 131B is added to the message queue 130A subsequent to adding of the message 131A and the message 133B to the message queue 130A and the message queue 130B, respectively. The queue manager 140A, in response to detecting that the message 131B is added to the message queue 130A, determining that the message 133B matches the message 131B, and determining that that the message 133B is stored at the message queue 130B, sends a second acknowledgement to the queue manager 140B.

The queue manager 140A proceeds to a message alignment phase for the message 131B subsequent to sending the second acknowledgement. The queue manager 140B proceeds to the message alignment phase for the message 133B responsive to receiving the second acknowledgement. For example, during the message alignment 460, the queue manager 140B, in response to receiving the second acknowledgement, sends a second match indicator output request to the queue manager 140A. The queue manager 140A, in response to receiving the second match indicator output request, sends a second match indicator output acknowledgement to the queue manager 140B and outputs the match indicator 151B to the message manager 150A of FIG. 1. The queue manager 140B, in response to receiving the second match indicator output acknowledgement from the queue manager 140A, outputs the match indicator 153B to the message manager 150B of FIG. 1.

The message 133A is added to the message queue 130B subsequent to the message 131B being added to the message queue 130A. The queue manager 140A and the queue manager 140B output the match indicator 151A and the match indicator 153A, respectively, responsive to the queue manager 140B detecting that the message 133A is added to the message queue 130B. Although the message 131A and the message 133B are added to the message queues 130 at the same time, the match indicator 151A for the message 131A is output subsequent to the output of the match indicator 153B for the message 133B because the matching message (e.g., the message 133A) for the message 131A is added to the message queue 130B subsequently to the matching message (e.g., the message 131B) for the message 133B being added to the message queue 130A.

The message 131C is added to the message queue 130A at the same time as the message 133D being added to the message queue 130B. The message 131D is added to the message queue 130A subsequent to the message 131C and the message 133D being added to the message queues 130. The message 133C is added to the message queue 130B subsequent to the message 131D being added to the message queue 130A. The match indicator 151C for the message 131C is output subsequent to the output of the match indicator 153D for the message 133D because the matching message (e.g., the message 133C) for the message 131C is added to the message queue 130B subsequently to the matching message (e.g., the message 131D) for the message 133D being added to the message queue 130A. In the examples 400 and 450, the arrival of the second matching message determines the timing of the output of match indicators.

In a particular example, the second matching message can arrive at the same time for multiple messages. To illustrate, the message 131D is added to the message queue 130A at the same time as the message 133C is added to the message queue 130B. In various implementations, the match indicators 151C, 153C for the messages 131C, 133C are output before or after the match indicators 151D, 153D for the messages 131D, 133D. For example, in a particular implementation, the message queue 130A has priority over the message queue 130B. In this implementation, the match indicators 151D, 153D for the messages 131D, 133D are output prior to output of the match indicators 151C, 153C for the messages 131C, 133C in response to the queue manager 140A detecting that the message 131D is added to the message queue 130A. In a particular implementation, the match indicators 151C, 153C for the messages 131C, 133C or the match indicators 151D, 153D for the messages 131D, 133D are output earlier based on internal synchronization logic timing.

Figure 5:
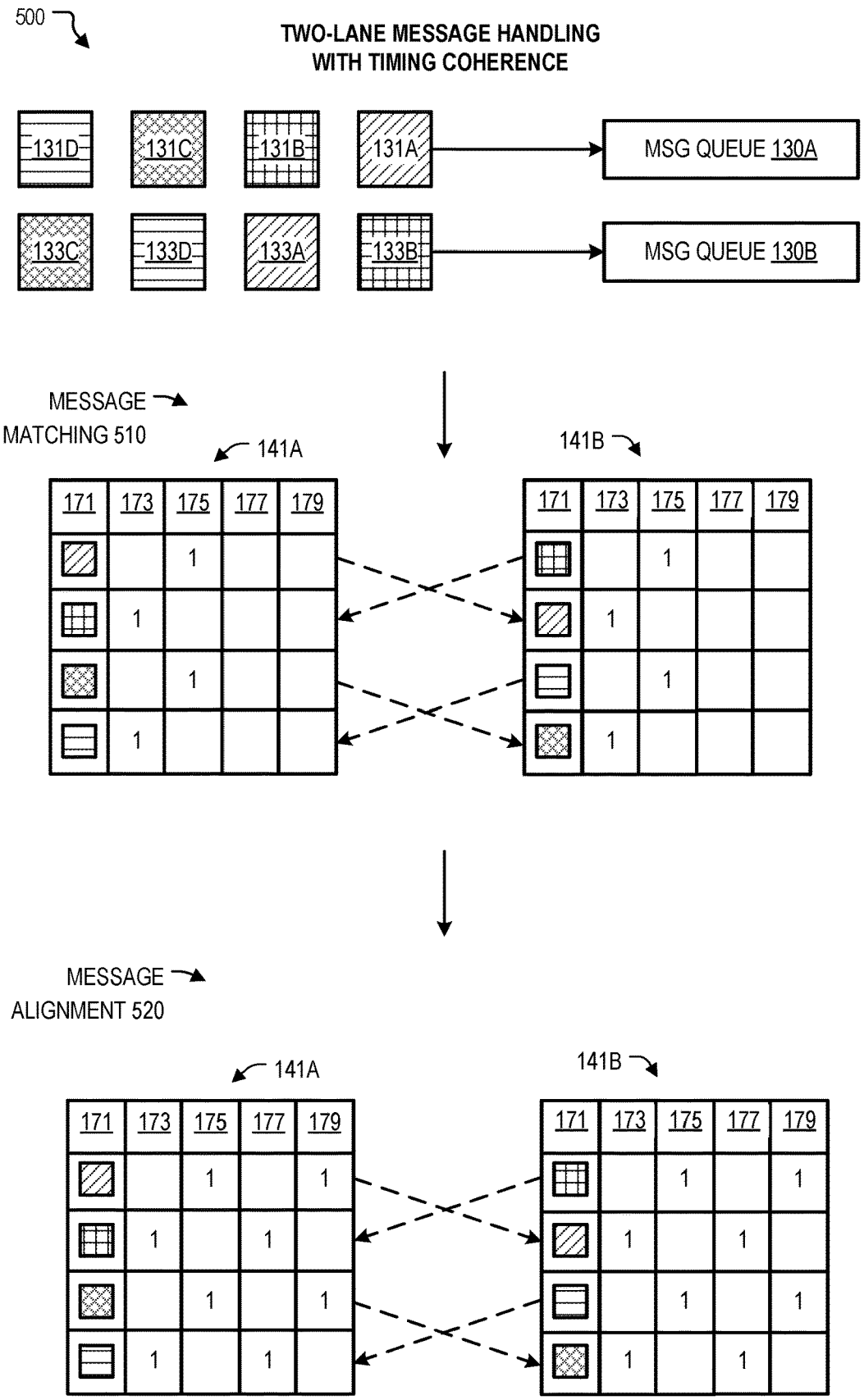
FIG. 5 is a diagram of a particular example of two-lane message handling performed by the system of FIG. 1.
Figure 6:
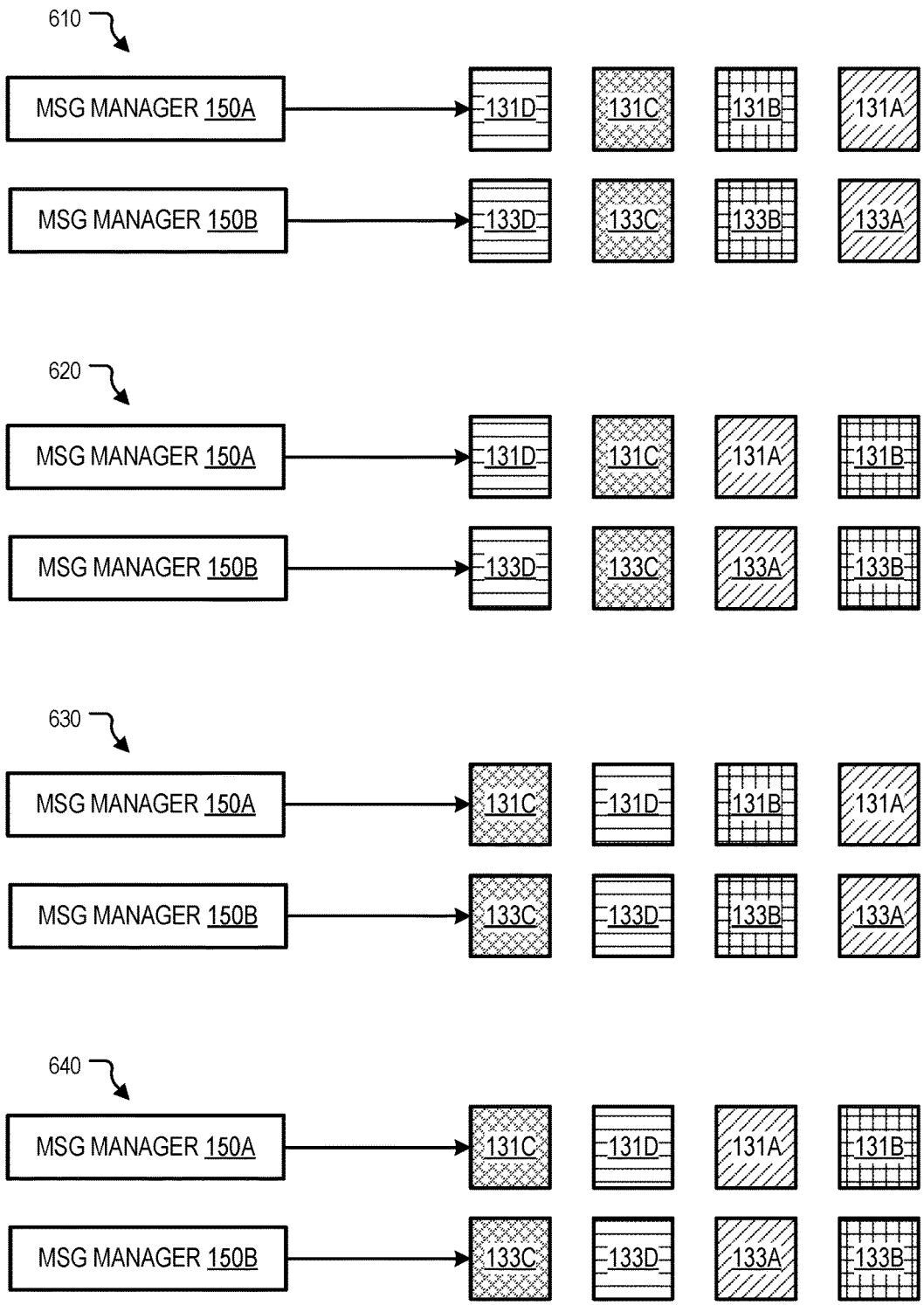
FIG. 6 is a diagram of particular examples of two-lane message handling performed by the system of FIG. 1.

FIGS. 5-6 provide examples of two-lane message handling performed by the system of FIG. 1. In FIG. 5, messages are added to each of the message queues at the same time. In FIG. 6, examples are provided that show the different order in which the messages can be output by the message managers in various implementations.

Referring to FIG. 5, an example 500 is shown in which messages are added to each of the message queues 130 at the same time. For example, the message 131A is added to the message queue 130A at the same time (e.g., a first time) as the message 133B is added to the message queue 130B. The message 131B is added to the message queue 130A at the same time (e.g., a second time) as the message 133A is added to the message queue 130B. The message 131C is added to the message queue 130A at the same time (e.g., a third time) as the message 133D is added to the message queue 130B. The message 131D is added to the message queue 130A at the same time (e.g., a fourth time) as the message 133C is added to the message queue 130B.

In a particular aspect, the source 120A generates the messages 131 in the order of the message 131A, the message 131B, the message 131C, and the message 131D. The source 120B generates the messages 133 in the order of the message 133A, the message 133B, the message 133C, and the message 133D. In some examples, the messages 131 and the messages 133 get reordered between the sources 120 and the message queues 130 for various reasons, such as due to out-of-order network delivery.

The queue managers 140 perform message matching 510 and message alignment 520. In a particular aspect, the queue managers 140 interleave processing queue additions with processing requests and acknowledgements. For example, in a first stage of processing queue additions during the message matching 510, the queue manager 140A, in response to detecting that the message 131A is added to the message queue 130A, sends a first request to the queue manager 140B and updates a first entry of the data table 141A. To illustrate, the queue manager 140A sets the indication field 171 of the first entry to include an indication of the message 131A and sets the request sent field 175 of the first entry to a first value (e.g., 1 or true) to indicate that the request is sent. The queue manager 140B, in response to detecting that the message 133B is added to the message queue 130B, sends a second request to the queue manager 140A and updates a first entry of the data table 141B. To illustrate, the queue manager 140B sets the indication field 171 of the first entry to include an indication of the message 133B and sets the request sent field 175 of the first entry to a first value (e.g., 1 or true) to indicate that the request is sent.

During a first stage of processing requests and acknowledgements, the queue manager 140A, in response to receiving the second request from the queue manager 140B, updates a second entry of the data table 141A. For example, the queue manager 140A sets the indication field 171 of the second entry to include an indication of the message 133B and sets the request received field 173 of the second entry to a first value (e.g., 1 or true) to indicate that the request is received. The queue manager 140B, in response to receiving the first request from the queue manager 140A, updates a second entry of the data table 141B. For example, the queue manager 140B sets the indication field 171 of the second entry to include an indication of the message 131A and sets the request received field 173 of the second entry to a first value (e.g., 1 or true) to indicate that the request is received.

During a second stage of processing queue additions, the queue manager 140A, in response to detecting that the message 131B is added to the message queue 130A and that the second entry of the data table 141A includes an indication (e.g., the indication of the message 133B) that matches an indication of the message 131B, sends a second acknowledgement (e.g., including an indication of the message 131B) to the queue manager 140B. The queue manager 140B, in response to detecting that the message 133A is added to the message queue 130B and that the second entry of the data table 141B includes an indication (e.g., the indication of the message 131A) that matches an indication of the message 133A, sends a first acknowledgement (e.g., including an indication of the message 133A) to the queue manager 140A.

During a second stage of processing requests and acknowledgements, the queue manager 140A, in response to receiving the first acknowledgement (e.g., including an indication of the message 133A), enters a message alignment phase for the message 131A. For example, during the message alignment 520, the queue manager 140A, sends a match indicator output request (e.g., including an indication of the message 131A) to the queue manager 140B and updates the match indicator output request sent field 179 of the first entry of the data table 141A to a first value (e.g., 1 or true). The queue manager 140B, in response to receiving the match indicator output request (e.g., including the indication of the message 131A) from the queue manager 140A, sends a match indicator output acknowledgement (e.g., including the indication of the message 133A) to the queue manager 140A and outputs the match indicator 153A for the message 133A to the message manager 150B. The queue manager 140A, in response to receiving the match indicator output acknowledgement (e.g., including the indication of the message 133A) from the queue manager 140B, outputs the match indicator 151A for the message 131A to the message manager 150A.

The queue manager 140B, in response to receiving the second acknowledgement, (e.g., including an indication of the message 131B) enters a message alignment phase for the message 133B. For example, during the message alignment 520, the queue manager 140B, sends a match indicator output request (e.g., including an indication of the message 133B) to the queue manager 140A and updates the match indicator output request sent field 179 of the first entry of the data table 141B to a first value (e.g., 1 or true). The queue manager 140A, in response to receiving the match indicator output request (e.g., including the indication of the message 133B) from the queue manager 140B, sends a match indicator output acknowledgement (e.g., including an indication of the message 131B) to the queue manager 140B and outputs the match indicator 151B for the message 131B to the message manager 150A. The queue manager 140B, in response to receiving the match indicator output acknowledgement (e.g., including the indication of the message 131B) from the queue manager 140A, outputs the match indicator 153B for the message 133B to the message manager 150B.

In some implementations, the match indicators 151A, 153A for the messages 131A and 133A are output prior to the output of the match indicators 151B, 153B for the messages 131B and 133B. In these implementations, the message managers 150 output the messages 131A and 133A prior to output of the message 131B and 133B, as illustrated in example 610 and example 630 of FIG. 6. In some implementations, the match indicators 151A, 153A for the messages 131A, 133A are output subsequent to the output of the match indicators 151B, 153B for the messages 131B, 133B. In these implementations, the message managers 150 output the messages 131A and 133A subsequent to output of the message 131B and 133B, as illustrated in example 620 and example 640 of FIG. 6.

Similar operations are performed to process the messages 131C, 131D, 133C, and 133D. In some implementations, the match indicators 151C, 153C for the messages 131C, 133C are output prior to the output of the match indicators 151D, 153D for the messages 131D, 133D. In these implementations, the message managers 150 output the messages 131C and 133C prior to output of the message 131D and 133D, as illustrated in the example 610 and the example 620 of FIG. 6. In some implementations, the match indicators 151C, 153C for the messages 131C, 133C are output subsequent to the output of the match indicators 151D, 153D for the messages 131D, 133D. In these implementations, the message managers 150 output the messages 131C and 133C subsequent to output of the message 131D and 133D, as illustrated in the example 630 and the example 640 of FIG. 6.

Figure 7:
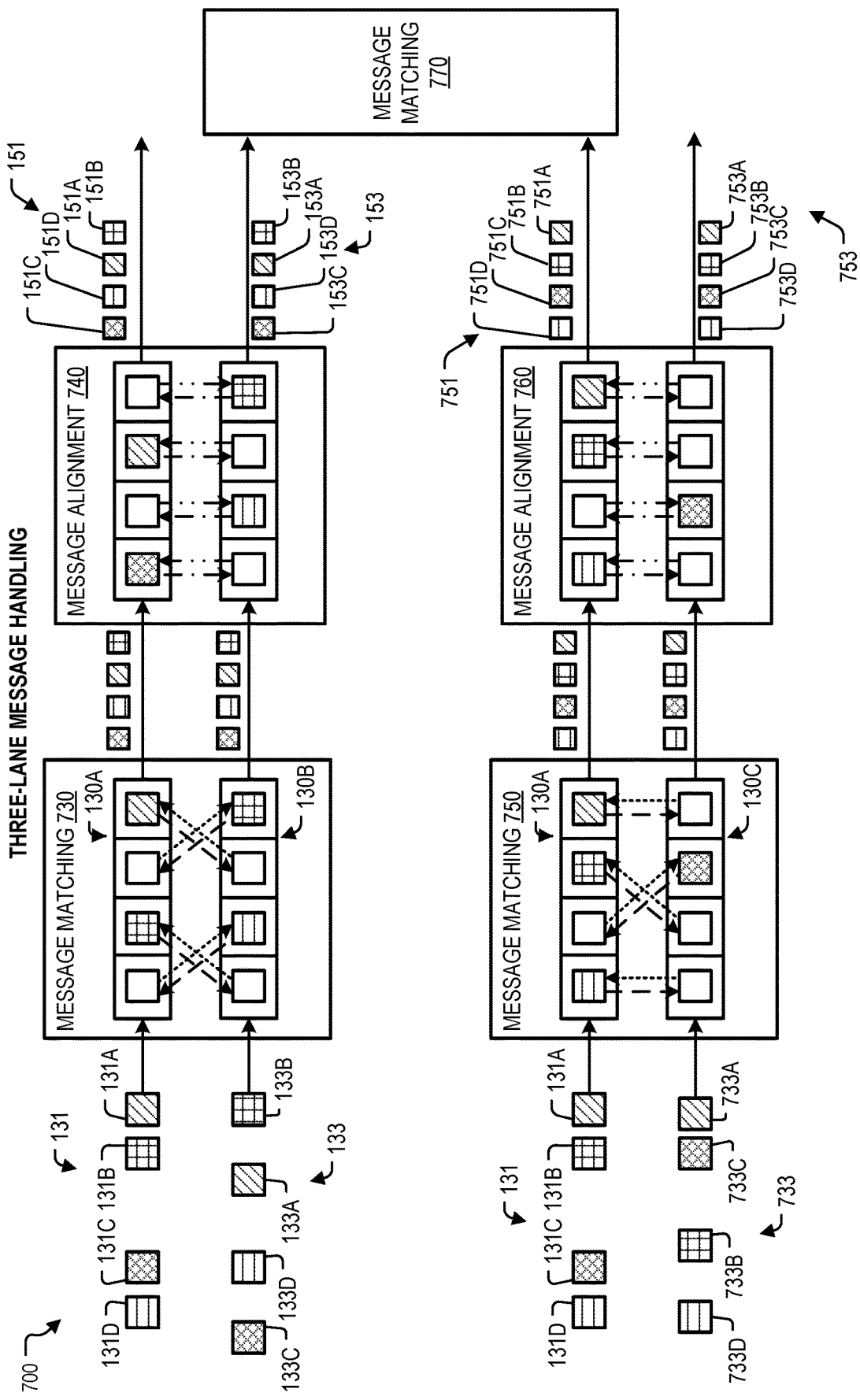
FIG. 7 is a diagram of a particular example of three-lane message handling performed by the system of FIG. 1.
Figure 8:
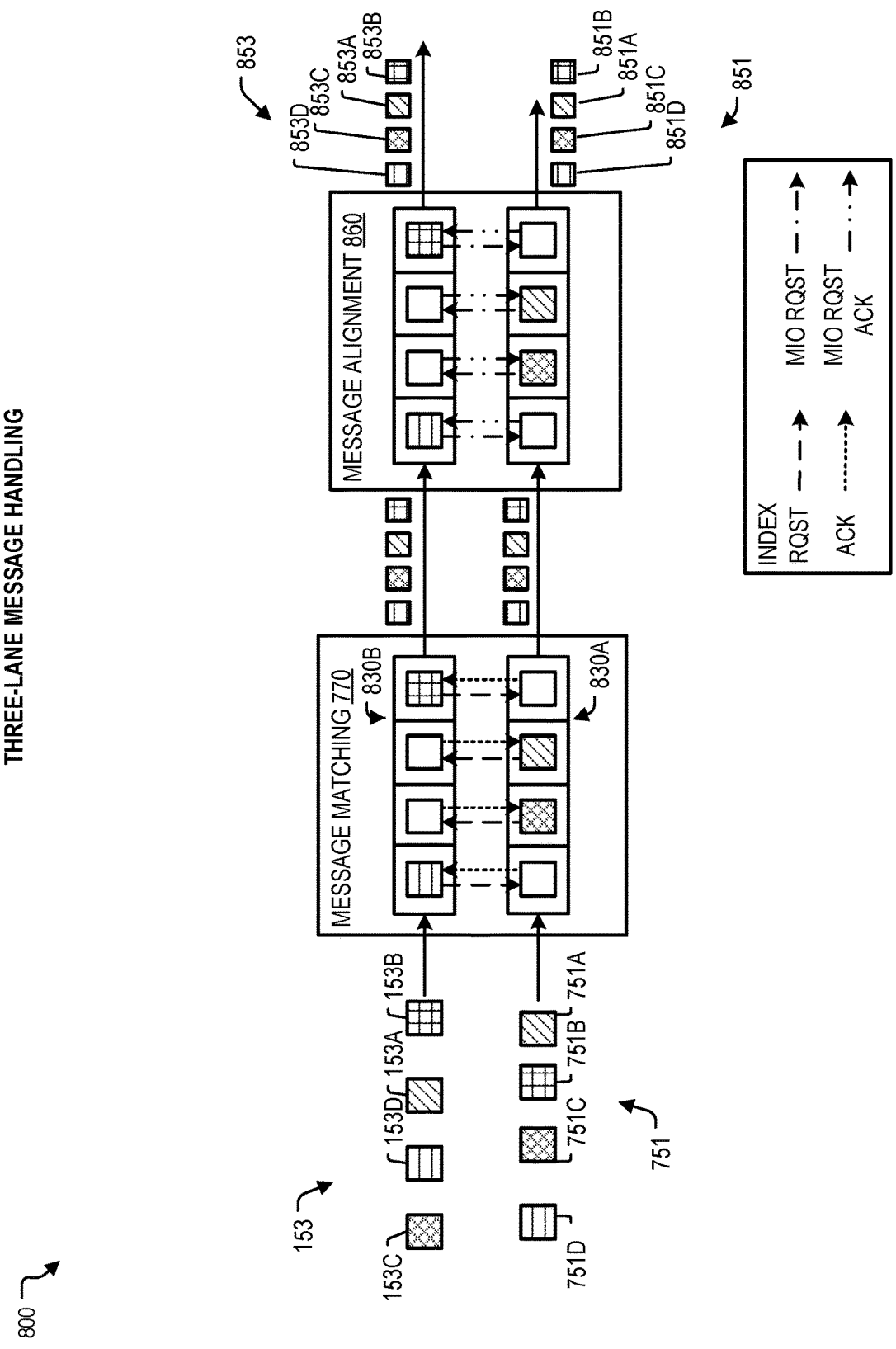
FIG. 8 is a diagram of a particular example of three-lane message handling performed by the system of FIG. 1.

FIGS. 7-8 provide an example of three-lane message handling performed by the system of FIG. 1. In FIG. 7, first messages from a first source and second messages from a second source are aligned and the first messages from the first source and third messages from a third source are aligned. In FIG. 8, the first aligned messages and the second aligned messages are aligned with each other so that the first messages, the second messages, and the third messages are aligned.

Referring to FIG. 7, an example 700 is shown in which the queue manager 140A and the queue manager 140B perform message matching 730 and message alignment 740 of the messages 131 and the messages 133. For example, the queue manager 140A and the queue manager 140B output the match indicators 151 for the messages 131 that are aligned with the match indicators 153 for the messages 133, as described with reference to FIG. 4.

In a particular aspect, messages 733 are received from a third source of the sources 120 and added to a message queue 130C of the message queues 130. The queue manager 140A and a third queue manager of the queue managers 140 perform message matching 750 and message alignment 760 of the messages 131 and the messages 733. For example, the queue manager 140A outputs match indicators 751 for the messages 131 that are aligned with match indicators 753 output by the third queue manager for the messages 733. To illustrate, the queue manager 140A and the third queue manager output the match indicators 751 and the match indicators 753 by performing operations similar to operations described with reference to FIG. 4 as performed by the queue manager 140A and the queue manager 140B.

In a particular aspect, the match indicators 751 correspond to the same messages (e.g. the messages 131) as the match indicators 151. The messages 131 may be indicated in the same order or a different order in match indicators 751 as compared to in the match indicators 151. The queue managers 140 perform message matching 770 based on the match indicators 153 and the match indicators 751. In a particular implementation, each of the match indicators 153 includes indications of a corresponding matching pair of messages. For example, the match indicator 153A includes an indication of the message 131A and an indication of the message 133A. Similarly, each of the match indicators 751 includes indications of a corresponding matching pair of messages. For example, the match indicator 751A includes an indication of the message 131A and an indication of the message 733A.

Referring to FIG. 8, an example 800 of three-lane message handling performed by the system of FIG. 1 is shown. For example, a fourth queue manager and a fifth queue manager of the queue managers 140 perform the message matching 770 and message alignment 860.

In a particular aspect, the fourth queue manager and the fifth queue manager perform operations similar to the queue manager 140A and the queue manager 140B, as described with reference to FIG. 4. For example, the match indicators 751 are added to a queue 830A and the match indicators 153 are added to a queue 830B. The fourth queue manager and the fifth queue manager treat the match indicators 153 and the match indicator 751 similar to messages received from a first source and a second source, respectively, and generate match indicators 853 and match indicators 851 that are aligned with each other.

In a particular implementation, each of the match indicators 853 and the match indicators 851 includes indications included in a corresponding match indicator. For example, a match indicator 853B includes indications (e.g., a first indication the message 131B and a second indication of the message 133B) included in the match indicator 153B. As another example, a match indicator 851B includes indications (e.g., the first indication of the message 131B and a third indication of the message 733B) included in the match indicator 751B.

In a particular implementation, the message managers 150 of FIG. 1, in response to receiving the match indicator 853B (e.g., including indications of the messages 131B, 133B) and the match indicator 851B (e.g., including indications of the messages 131B, 733B), output the message 131B, the message 133B, and the message 733B from the data memory 160. Similarly, the message managers 150, in response to receiving a match indicator 853A (e.g., including indications of the messages 131A, 133A) and a match indicator 851A (e.g., including indications of the messages 131A, 733A), output the message 131A, the message 133A, and the message 733A from the data memory 160. The message managers 150, in response to receiving a match indicator 853C (e.g., including indications of the messages 131C, 133C) and a match indicator 851C (e.g., including indications of the messages 131C, 733C), output the message 131C, the message 133C, and the message 733C from the data memory 160. The message managers 150, in response to receiving a match indicator 853D (e.g., including indications of the messages 131D, 133D) and a match indicator 851D (e.g., including indications of the messages 131D, 733D), output the message 131D, the message 133D, and the message 733D from the data memory 160.

The queue managers 140 thus enable alignment of messages from multiple sources (e.g., lanes). Although, three lanes are described, in other implementation, the queue managers 140 can enable alignment of messages from more than three lanes. As an example, messages from n lanes can be aligned by aligning messages from the first and second lanes, the second and third lanes, . . . , and the (n–1) lane and the nth lane to generate n–1 sets of match indicators. The match indicators can be aligned by aligning the first and second sets of match indicators, the second and third sets of match indicators, . . . , the (n–2) and (n–1) sets. The process can be repeated for aligning the sets of match indicators until reaching an aligned pair of sets of match indicators. The messages corresponding to the aligned pair of the sets of match indicators can be output.

Figure 9:
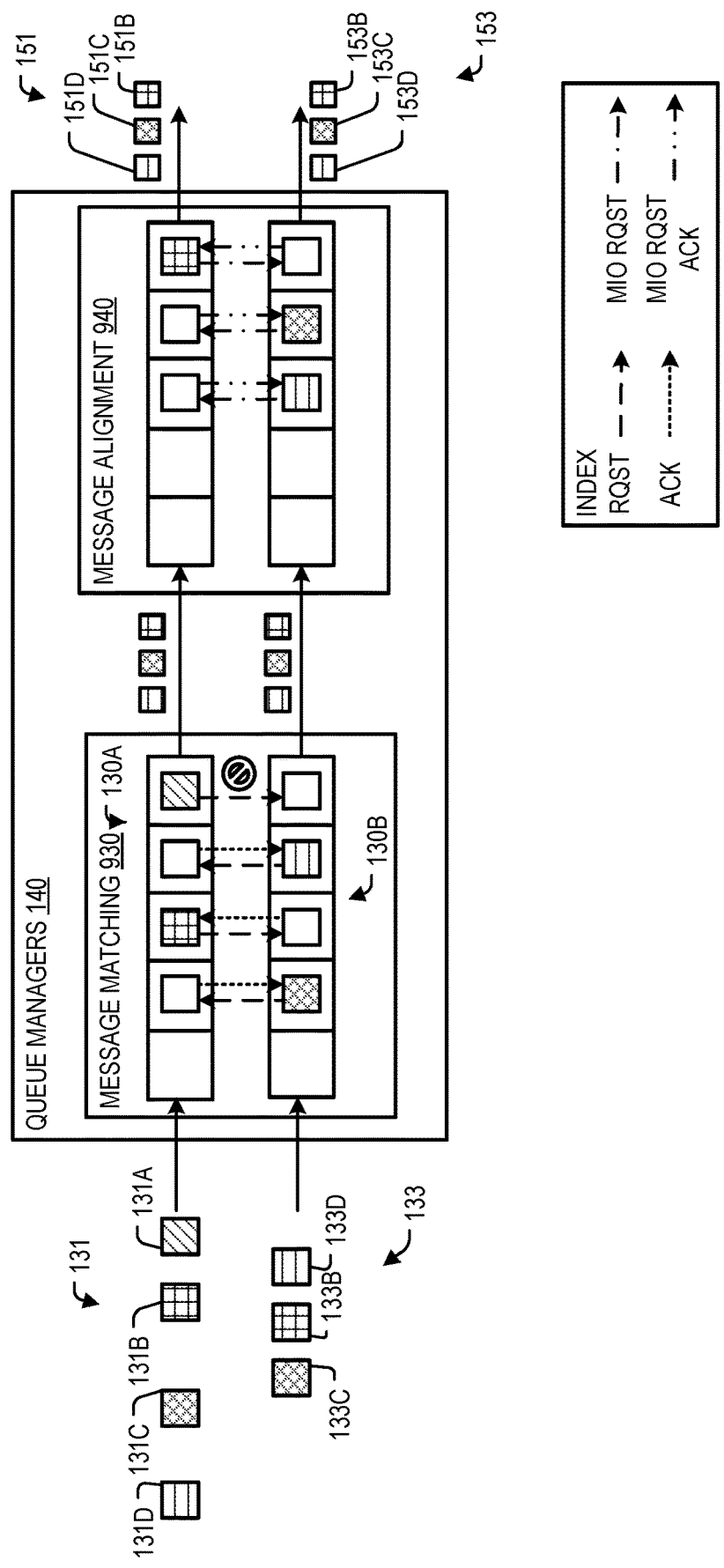
FIG. 9 is a diagram of a particular example of dropping a message by the system of FIG. 1.

Referring to FIG. 9, an example 900 of dropping a message by the system of FIG. 1 is shown. In a particular aspect, the queue managers 140 perform message matching 930 and message alignment 940.

During the message matching 930, the queue manager 140A sends the request 143 to the queue manager 140B in response to detecting that the message 131A is added to the message queue 130A, as described with reference to FIG. 1. The queue manager 140A determines that the message 131A has timed out in response to determining, at a first time, that a difference between a receipt time of adding the message 131A to the message queue 130A and the first time is greater than a queue storage threshold. The queue manager 140A, in response to determining that the message 131A has timed out, removes the message 131A from the message queue 130A.

In a particular aspect, removing the message 131A from the message queue 130A includes removing an indication of the message 131A from the message queue 130A, removing the message 131A from the data memory 160, removing any entry in the data table 141A that includes the indication of the message 131A, removing any entry in the data table 141B that includes an indication that matches the indication of the message 131A, or a combination thereof.

The example 900 thus prevents the message 131A from being indefinitely stored in the message queue 130A when the message 133A is lost. Removal of the message 131A can save resources from being used to process delayed messages (e.g., including the message 133A) that are no longer relevant in time-critical applications.

Figure 10:
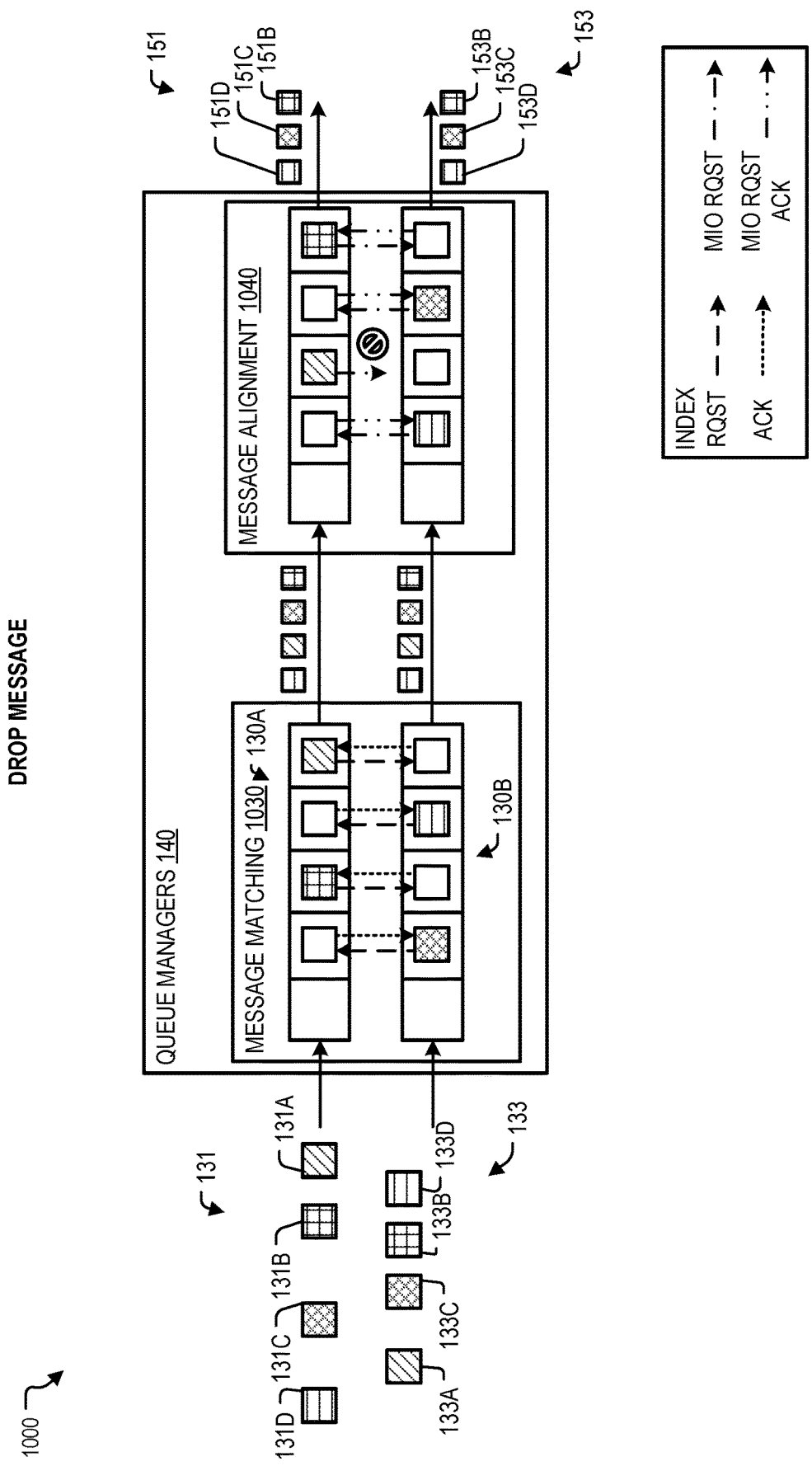
FIG. 10 is a diagram of a particular example of dropping a message by the system of FIG. 1.

Referring to FIG. 10, an example 1000 of dropping a message by the system of FIG. 1 is shown. In a particular aspect, the queue managers 140 perform message matching 1030 and message alignment 1040.

During the message alignment 1040, the queue manager 140A sends the match indicator output request 147 to the queue manager 140B in response to receiving the acknowledgement 145 from the queue manager 140B, as described with reference to FIG. 1. The queue manager 140A determines that the message 131A has timed out in response to determining, at a first time, that a difference between a receipt time of adding the message 131A to the message queue 130A and the first time is greater than a queue storage threshold. The queue manager 140A, in response to determining that the message 131A has timed out, removes the message 131A from the message queue 130A.

In a particular aspect, removing the message 131A from the message queue 130A includes removing an indication of the message 131A from the message queue 130A, removing the message 131A from the data memory 160, removing any entry in the data table 141A that includes an indication matching an indication of the message 131A, removing any entry in the data table 161A that includes an indication matching the indication of the message 131A, or a combination thereof.

In a particular aspect, removing the message 131A from the message queue 130A includes removing any message from a message queue that has an indication that matches an indication of the message 131A. For example, the queue manager 140A, in response to determining that the message 131A has timed out, sends a removal request including an indication of the message 131A to the queue manager 140B. The queue manager 140B, in response to receiving the removal request, removes any message from the message queue 130B that has an indication matching the indication of the message 131A, removes any entry in the data table 141B that includes an indication matching an indication of the message 131A, removes any entry in the data table 161 that includes an indication matching the indication of the message 131A, or a combination thereof. For example, removing the message 133A from the message queue 130B includes removing an indication of the message 133A from the message queue 130B, removing the message 133A from the data memory 160, removing any entry in the data table 141B that includes an indication matching an indication of the message 133A, removing any entry in the data table 161B that includes an indication matching the indication of the message 133A, or a combination thereof.

In a particular aspect, the queue manager 140B, subsequent to receiving the match indicator 153A from the queue manager 140B, removes entries from the data table 141B and the data table 161B that correspond to the message 133A (e.g., that include an indication matching the indication of the message 131A). The queue manager 140 receives the match indicator output request 147 (e.g., including an indication of the message 131A) subsequent to removing the entries from the data table 141B and the data table 161B. The queue manager 140B discard the match indicator output request 147 in response to determining that none of the entries of the data table 141B and the data table 161B include an indication that matches the indication of the message 131A.

The example 1000 thus enables removal of the message 131A and the message 133A when the message 131A has timed out because the message 133A is delayed relative to the message 131A. Removal of the messages 131A,133A can save resources from being used to process delayed messages (e.g., including the message 133A) that are no longer relevant in time-critical applications.

Figure 11:
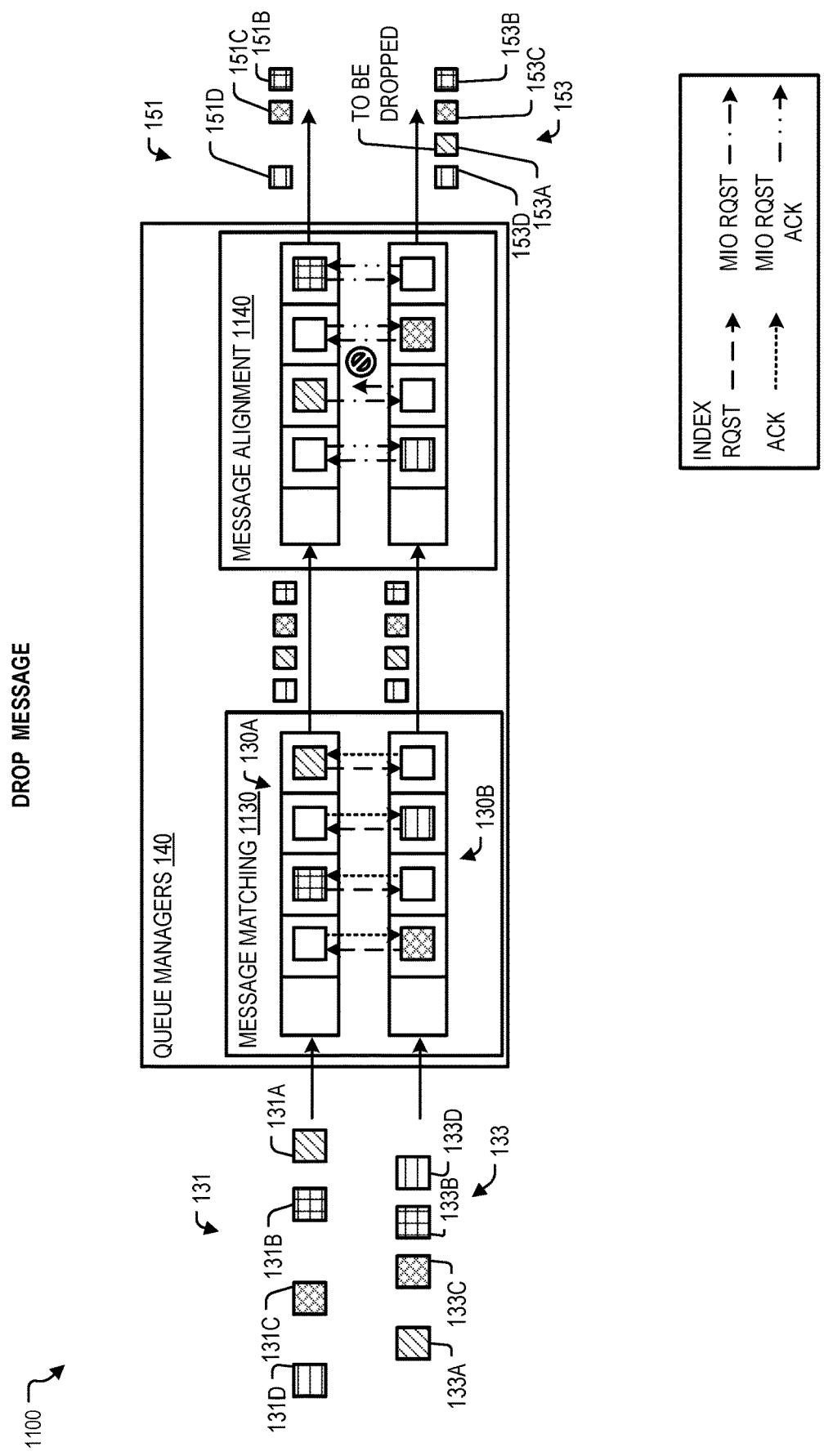
FIG. 11 is a diagram of a particular example of dropping a message by the system of FIG. 1.

Referring to FIG. 11, an example 1100 of dropping a message by the system of FIG. 1 is shown. In a particular aspect, the queue managers 140 perform message matching 1130 and message alignment 1140.

During the message alignment 1140, the queue manager 140B, in response to receiving the match indicator output request 147 from the queue manager 140A, sends the match indicator output acknowledgement 149 to the queue manager 140A, outputs the match indicator 153A (e.g., including the indication of the message 133A), as described with reference to FIG. 1. The queue manager 140A, in response to determining that the message 131A has timed out, as described with reference to FIG. 10, removes the message 131A from the message queue 130A. The queue manager 140, in response to determining that the message 131A has timed out, refrains from outputting the match indicator 151A for the message 131A. For example, the queue manager 140, in response to receiving the match indicator output acknowledgement 149 from the queue manager 140B and determining that none of the entries of the data table 141 and the data table 161A include an indication that matches the indication of the message 131A, discards the match indicator output acknowledgement 149 without outputting any corresponding match indicator.

In a particular aspect, the message manager 150B, in response to determining that no matching match indicator is received from the message manager 150A within a threshold of receiving the match indicator 153A from the queue manager 140B, refrains from outputting the message 131A, removes the message 131A from the message queue 130A, discards the match indicator 151A, or a combination thereof.

The example 1100 thus enables removal of the message 131A and the message 133A when the message 131A has timed out because the message 133A is delayed relative to the message 131A. Removal of the messages 131A,133A can save resources from being used to process delayed messages (e.g., including the message 133A) that are no longer relevant in time-critical applications.

Figure 12:
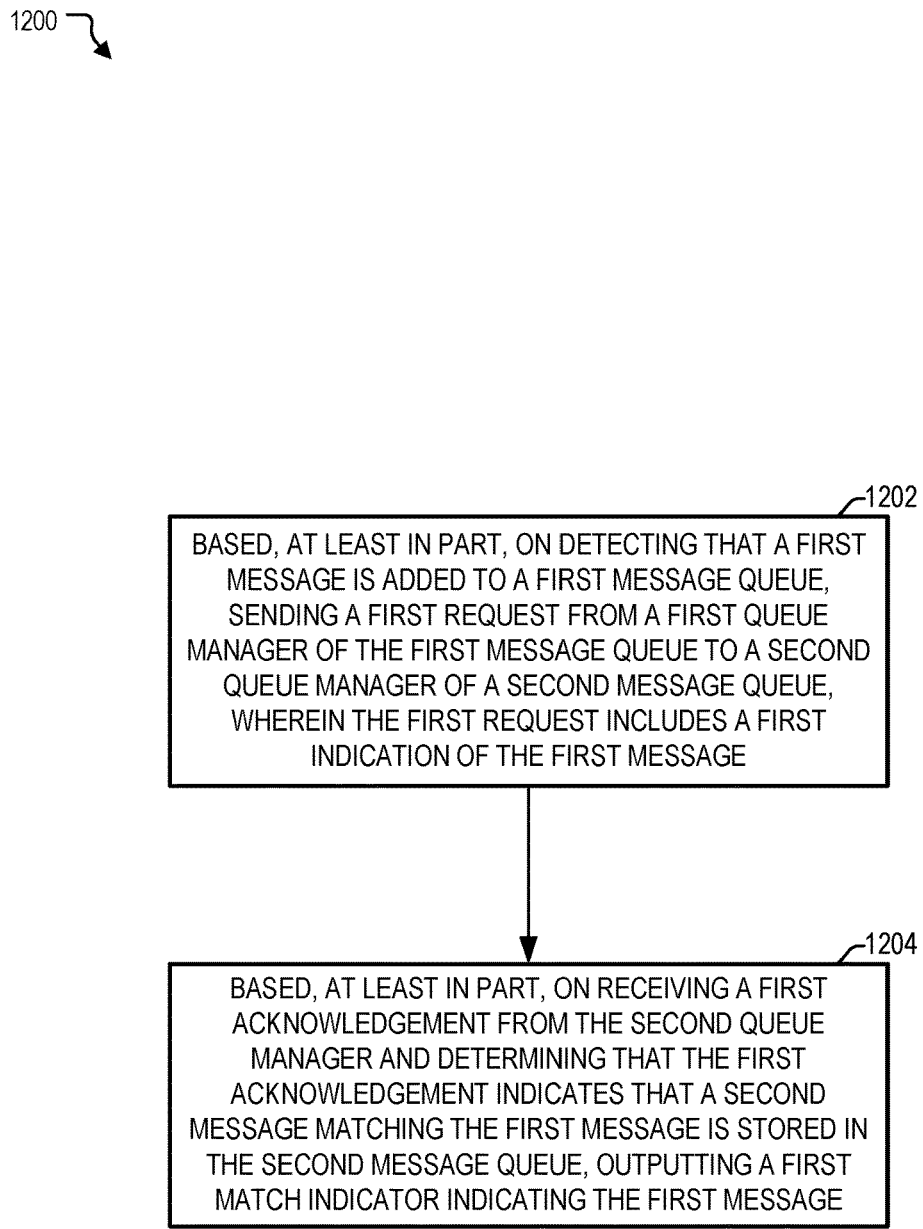
FIG. 12 is a diagram that illustrates a flow chart of an example of method of aligning messages from multiple sources.

Referring to FIG. 12, an example of a method of aligning message from multiple sources is shown and generally designated 1200. In a particular aspect, one or more operations of the method 1200 are performed by the queue manager 140A, the queue managers 140, the device 102, the system 100 of FIG. 1, or a combination thereof.

The method 1200 includes, based, at least in part, on detecting that a first message is added to a first message queue, sending a first request from a first queue manager of the first message queue to a second queue manager of a second message queue, where the first request includes a first indication of the first message, at 1202. For example, the queue manager 140A of FIG. 1, based, at least in part, on detecting that the message 131A is added to the message queue 130A, sends the request 143 to the second queue manager 140B, as described with reference to FIG. 1. The request 143 includes a first indication of the message 131A.

The method 1200 also includes, based, at least in part, on receiving a first acknowledgement from the second queue manager and determining that the first acknowledgement indicates that a second message matching the first message is stored in the second message queue, outputting a first match indicator indicating the first message, at 1204. For example, the queue manager 140A of FIG. 1, based, at least in part, on receiving the acknowledgement 145 from the queue manager 140B and determining that the acknowledgement 145 indicates that the message 133A matching the message 131A is stored in the message queue 130B, outputs the match indicator 151A indicating the message 131A, as described with reference to FIG. 1.

The method 1200 thus enables alignment of the message 131A and the message 133A. For example, the queue manager 140A waits to output the match indicator 151A until determining that both the message 131A and the message 133A are stored in the message queues 130. The message managers 150 concurrently output the messages 131A and 133A responsive to receiving the match indicators 151A and 153A.

Figure 13:
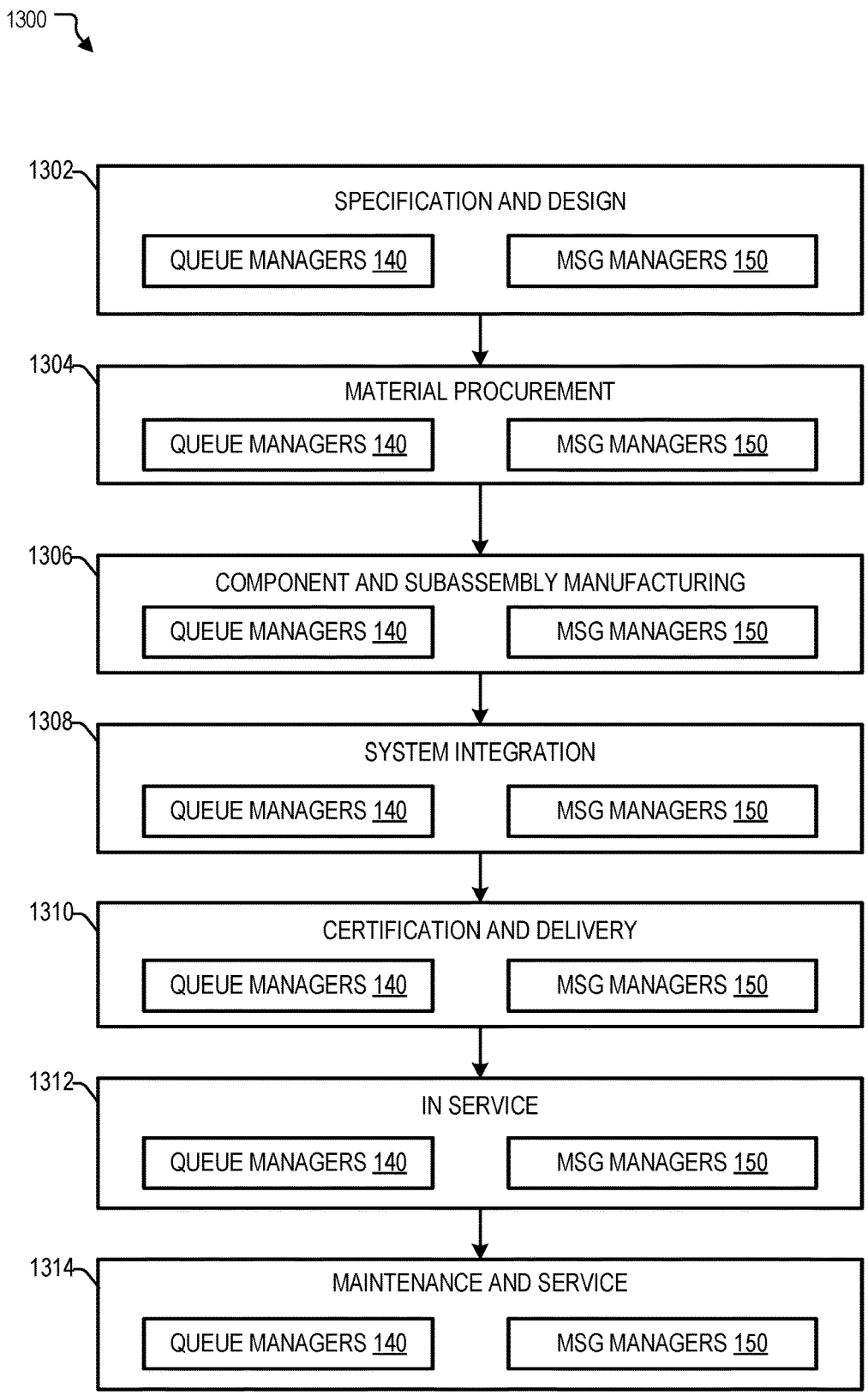
FIG. 13 is a flowchart illustrating a life cycle of an aircraft that includes queue managers and message managers of FIG. 1.

Referring to FIG. 13, a flowchart illustrative of a life cycle of an aircraft that includes queue managers and message managers is shown and designated 1300. During pre-production, the exemplary method 1300 includes, at 1302, specification and design of an aircraft, such as the aircraft 1400 described with reference to FIG. 14. During specification and design of the aircraft, the method 1300 may include specification and design of the queue managers 140 and the message managers 150. At 1304, the method 1300 includes material procurement, which may include procuring materials for the queue managers 140 and the message managers 150.

During production, the method 1300 includes, at 1306, component and subassembly manufacturing and, at 1308, system integration of the aircraft. For example, the method 1300 may include component and subassembly manufacturing of the queue managers 140 and the message managers 150 and system integration of the queue managers 140 and the message managers 150. At 1310, the method 1300 includes certification and delivery of the aircraft and, at 1312, placing the aircraft in service. Certification and delivery may include certification of the queue managers 140 and the message managers 150 to place the queue managers 140 and the message managers 150 in service. While in service by a customer, the aircraft may be scheduled for routine maintenance and service (which may also include modification, reconfiguration, refurbishment, and so on). At 1314, the method 1300 includes performing maintenance and service on the aircraft, which may include performing maintenance and service on the queue managers 140 and the message managers 150.

Each of the processes of the method 1300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Aspects of the disclosure can be described in the context of an example of a vehicle. A particular example of a vehicle is an aircraft 1400 as shown in FIG. 14.

Figure 14:
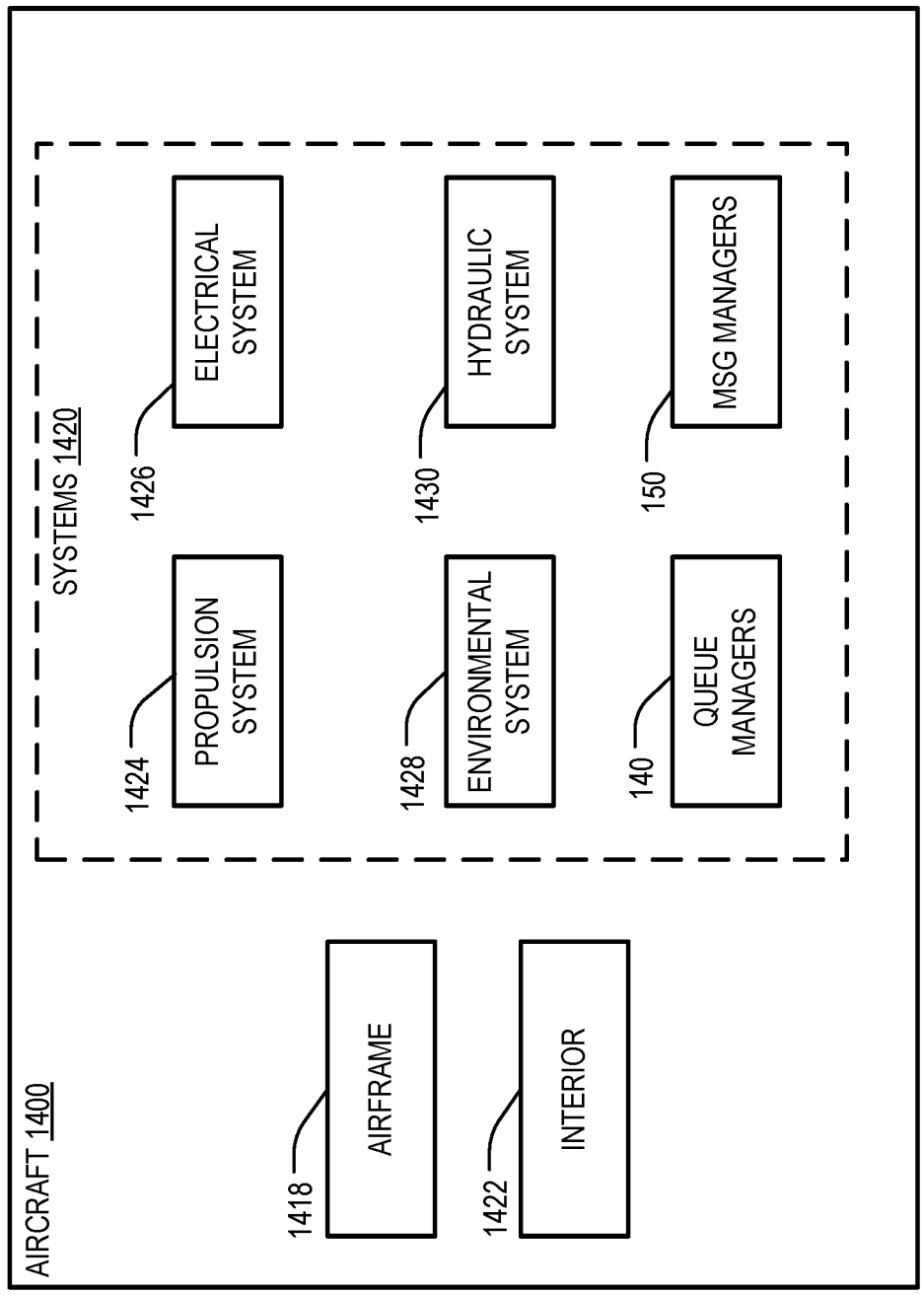
FIG. 14 is a block diagram of an aircraft that is configured to align messages from multiple sources.

In the example of FIG. 14, the aircraft 1400 includes an airframe 1418 with a plurality of systems 1420 and an interior 1422. Examples of the plurality of systems 1420 include one or more of a propulsion system 1424, an electrical system 1426, an environmental system 1428, and a hydraulic system 1430. Any number of other systems may be included. For example, the plurality of systems 1420 include the queue managers 140, the message managers 150, or a combination thereof.

FIG. 15 is a block diagram of a computing environment 1500 including a computing device 1510 configured to support aspects of computer-implemented methods and computer-executable program instructions (or code) according to the present disclosure. For example, the computing device 1510, or portions thereof, is configured to execute instructions to initiate, perform, or control one or more operations described with reference to FIGS. 1-14.

The computing device 1510 includes one or more processors 1520. The processor(s) 1520 are configured to communicate with system memory 1530, one or more storage devices 1540, one or more input/output interfaces 1550, one or more communications interfaces 1560, or any combination thereof. The system memory 1530 includes volatile memory devices (e.g., random access memory (RAM) devices), nonvolatile memory devices (e.g., read-only memory (ROM) devices, programmable real5only memory, and flash memory), or both. The system memory 1530 stores an operating system 1532, which may include a basic input/output system for booting the computing device 1510 as well as a full operating system to enable the computing device 1510 to interact with users, other programs, and other devices. The system memory 1530 stores system (program) data 1536, such as the data table 141A, the data table 141B, the data table 161A, the data table 161B of FIG. 1, or a combination thereof. In a particular aspect, the system memory 1530 includes the message queues 130, the data memory 160 of FIG. 1, or a combination thereof.

In a particular aspect, the one or more processors 1520 can be implemented as a single processor or as multiple processors, such as in a multi-core configuration, a multiprocessor configuration, a distributed computing configuration, a cloud computing configuration, or any combination thereof. In some implementations, one or more portions of the queue managers 140, the message managers 150, or a combination thereof, are implemented by the one or more processors 1520 using dedicated hardware, firmware, or a combination thereof.

The system memory 1530 includes one or more applications 1534 (e.g., sets of instructions) executable by the processor(s) 1520. As an example, the one or more applications 1534 include instructions executable by the processor(s) 1520 to initiate, control, or perform one or more operations described with reference to FIGS. 1-14. To illustrate, the one or more applications 1534 include instructions executable by the processor(s) 1520 to initiate, control, or perform one or more operations described with reference to the queue managers 140, the message managers 150, or a combination thereof.

In a particular implementation, the system memory 1530 includes a non-transitory, computer readable medium (e.g., a computer-readable storage device) storing the instructions that, when executed by the processor(s) 1520, cause the processor(s) 1520 to initiate, perform, or control operations to align messages from multiple sources. The operations include, based, at least in part, on detecting that a first message (e.g., the message 131A) is added to a first message queue (e.g., the message queue 130A), send a first request (e.g., the request 143) from a first queue manager (e.g., the queue manager 140A) of the first message queue to a second queue manager (e.g., the queue manager 140B) of a second message queue (e.g., the message queue 130B). The first request (e.g., the request 143) includes a first indication of the first message (e.g., the message 131A). The operations also include based, at least in part, on receiving a first acknowledgement (e.g., the acknowledgement 145) from the second queue manager (e.g., the queue manager 140B) and determining that the first acknowledgement (e.g., the acknowledgement 145) indicates that a second message (e.g., the message 133A) matching the first message (e.g., the message 131A) is stored in the second message queue (e.g., the message queue 130B), output a first match indicator (e.g., the match indicator 151A) indicating the first message (e.g., the message 131A).

The one or more storage devices 1540 include nonvolatile storage devices, such as magnetic disks, optical disks, or flash memory devices. In a particular example, the storage devices 1540 include both removable and non-removable memory devices. The storage devices 1540 are configured to store an operating system, images of operating systems, applications (e.g., one or more of the applications 1534), and program data (e.g., the program data 1536). In a particular aspect, the system memory 1530, the storage devices 1540, or both, include tangible computer-readable media. In a particular aspect, one or more of the storage devices 1540 are external to the computing device 1510.

The one or more input/output interfaces 1550 enable the computing device 1510 to communicate with one or more input/output devices 1570 to facilitate user interaction. For example, the one or more input/output interfaces 1550 can include a display interface, an input interface, or both. For example, the input/output interface 1550 is adapted to receive input from a user, to receive input from another computing device, or a combination thereof. In some implementations, the input/output interface 1550 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 1570 includes one or more user interface devices and displays, including some combination of buttons, keyboards, pointing devices, displays, speakers, microphones, touch screens, and other devices.

The processor(s) 1520 are configured to communicate with devices or controllers 1580 via the one or more communications interfaces 1560. For example, the one or more communications interfaces 1560 can include a network interface. The devices or controllers 1580 can include, for example, one or more of the sources 120, one or more other devices, or any combination thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-14. In some implementations, part or all of one or more of the operations or methods of FIGS. 1-14 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device comprising:
    a first message queue configured to store first messages received from a first source;
    a second message queue configured to store second messages received from a second source distinct from the first source; and
    a first queue manager coupled to the first message queue, wherein the first queue manager is configured to:
        based, at least in part, on detecting that a first message including a first indication is added to the first message queue, send a first request to a second queue manager, wherein the first request includes the first indication of the first message; and
        based, at least in part, on receiving a first acknowledgement from the second queue manager and determining that the first acknowledgement indicates that a second message with a second indication corresponding to the first indication is stored in the second message queue, output a first match indicator indicating the first message, wherein the second message is distinct from the first message,
    wherein the second queue manager is coupled to the second message queue.

2. The device of claim 1, wherein the first message queue includes a first active port array, and wherein the second message queue includes a second active port array.

3. The device of claim 1, wherein the first queue manager is configured to send the first request to the second queue manager further based on determining that no request has been received from the second queue manager that indicates a message with an indication corresponding to the first indication.

4. The device of claim 1, wherein the second queue manager is configured to:

subsequent to receiving the first request from the first queue manager, detect that the second message is added to the second message queue; and based, at least in part, on determining that the second indication of the second message corresponds to the first indication, send the first acknowledgement to the first queue manager.

5. The device of claim 1, wherein the first queue manager is configured to, in response to receiving the first acknowledgement from the second queue manager and determining that the first acknowledgement indicates that the second message with the second indication corresponding to the first indication is stored in the second message queue:

send a match indicator output request to the second queue manager; and receive a match indicator output acknowledgement from the second queue manager, wherein the first match indicator is output responsive to receiving the match indicator output acknowledgement.

6. The device of claim 5, wherein the second queue manager is configured to, in response to receiving the match indicator output request:

send the match indicator output acknowledgement to the first queue manager; and output a second match indicator indicating the second message.

7. The device of claim 1, further comprising:

a first message manager coupled to the first queue manager, wherein the first message manager is configured to:

in response to receiving the first match indicator from the first queue manager, send the first match indicator to a second message manager; and in response to determining that a second match indicator received from the second message manager matches the first match indicator, remove the first message from the first message queue and output the first message, wherein the second message manager is coupled to the second queue manager.

8. The device of claim 7, wherein the second message manager is configured to:

in response to receiving the second match indicator from the second queue manager, send the second match indicator to the first message manager; and in response to determining that the first match indicator received from the first message manager matches the second match indicator, remove the second message from the second message queue and output the second message.

9. The device of claim 7, wherein the first message queue is configured to receive the first message from the first source asynchronously from receipt of the second message by the second message queue from the second source, and wherein the first message manager is configured to output the first message concurrently with output of the second message by the second message manager.

10. The device of claim 7, further comprising:

a plurality of message queues including the first message queue, the second message queue, and one or more additional message queues, wherein each of the plurality of message queues is configured to asynchronously receive a corresponding message of a plurality of matching messages; and a plurality of message managers including the first message manager, the second message manager, and one or more additional message managers, wherein each of the plurality of message managers is configured to concurrently output a corresponding message of the matching messages.

11. The device of claim 1, further comprising a data memory, wherein the first queue manager is configured such that detecting that the first message is added to the first message queue includes determining that the first indication is stored in the first message queue and that the first message is stored in the data memory.

12. The device of claim 11, further comprising a first message manager configured to remove the first message by:

marking the first indication for deletion from the first message queue; and marking the first message for deletion from the data memory.

13. The device of claim 1, further comprising a first data table, wherein the first queue manager is further configured to:

based, at least in part, on detecting that the first message is added to the first message queue and the first data table does not include any entry including an indication corresponding to the first indication, add the first indication to an indication field of a first entry of the first data table; and concurrently with sending the first request, update a request sent field of the first entry to indicate that the first request has been sent.

14. The device of claim 13, wherein the first queue manager is further configured to, in response to receiving the first acknowledgement, update an acknowledgement received field of the first entry to indicate that the first acknowledgement has been received.

15. A method comprising:

based, at least in part, on detecting that a first message from a first source and including a first indication is added to a first message queue, sending a first request from a first queue manager of the first message queue to a second queue manager of a second message queue, wherein the first request includes a first indication of the first message; and based, at least in part, on receiving a first acknowledgement from the second queue manager and determining that the first acknowledgement indicates that a second message with a second indication corresponding to the first indication is stored in the second message queue, outputting a first match indicator indicating the first message, wherein the second message is from a second source distinct from the first source, and wherein the second message is distinct from the first message.

16. The method of claim 15, further comprising:

receiving, at the first queue manager, a second request from the second queue manager, wherein the second request includes a third indication of a third message added to the second message queue; and in response to detecting that a fourth message with a fourth indication corresponding to the third indication is added to the first message queue, sending a second acknowledgement from the first queue manager to the second queue manager.

17. The method of claim 16, further comprising:

in response to receiving a second match indicator output request at the first queue manager from the second queue manager, outputting a second match indicator indicating the fourth message; and subsequent to outputting the second match indicator, sending a second match indicator output acknowledgement from the first queue manager to the second queue manager.

18. The method of claim 15, further comprising, in response to determining that a first particular message has timed out in the first message queue, removing the first particular message from the first message queue.

19. A computer-readable storage device storing instructions that, when executed by one or more processors, cause the one or more processors to:
   based, at least in part, on detection that a first message is added to a first message queue, send a first request from a first queue manager of the first message queue to a second queue manager of a second message queue, wherein the first message is from a first source and includes a first indication, and wherein the first request includes the first indication of the first message; and
   based, at least in part, on receipt of a first acknowledgement from the second queue manager and a first determination that the first acknowledgement indicates that a second message with a second indication corresponding to the first indication is stored in the second message queue, output a first match indicator indicating the first message, wherein the second message is from a second source distinct from the first source, and wherein the second message is distinct from the first message.

20. The computer-readable storage device of claim 19, wherein the instructions, when executed by the one or more processors, further cause the one or more processors to:
   in response to receiving the first match indicator at a first message manager from the first queue manager, send the first match indicator from the first message manager to a second message manager; and
   in response to a second determination that a second match indicator received from the second message manager matches the first match indicator, remove the first message from the first message queue and output the first message.

\* \* \* \* \*